(12) United States Patent
Ishida

(10) Patent No.: US 9,286,062 B2
(45) Date of Patent: Mar. 15, 2016

(54) STRUCTURE ANALYSIS DEVICE AND PROGRAM

(71) Applicants: Shinichi Ishida, Odawara-shi, Kanagawa (JP); Tsutomu Matsuzaki, Inagi-shi, Tokyo (JP); I-SYSTEM CO., LTD., Chiyoda-ku, Tokyo (JP)

(72) Inventor: Shinichi Ishida, Odawara (JP)

(73) Assignees: I-SYSTEM CO., LTD., Tokyo (JP); Shinichi Ishida, Kanagawa (JP); Tsutomu Matsuzaki, Tokyo (JP)

(*) Notice: Subject to any disclaimer, the term of this patent is extended or adjusted under 35 U.S.C. 154(b) by 0 days.

(21) Appl. No.: 14/391,377

(22) PCT Filed: Apr. 5, 2013

(86) PCT No.: PCT/JP2013/060528
§ 371 (c)(1),
(2) Date: Oct. 8, 2014

(87) PCT Pub. No.: WO2013/154055
PCT Pub. Date: Oct. 17, 2013

(65) Prior Publication Data
US 2015/0128109 A1    May 7, 2015

(30) Foreign Application Priority Data
Apr. 9, 2012   (JP) .................. 2012-088098

(51) Int. Cl.
*G06F 9/45* (2006.01)
*G06F 9/44* (2006.01)
*G06F 11/36* (2006.01)

(52) U.S. Cl.
CPC .............. *G06F 8/75* (2013.01); *G06F 11/3604* (2013.01)

(58) Field of Classification Search
None
See application file for complete search history.

(56) References Cited

U.S. PATENT DOCUMENTS

2006/0117302 A1* 6/2006 Mercer et al. ............. 717/131
2007/0294682 A1* 12/2007 Demetriou et al. ........ 717/153
(Continued)

FOREIGN PATENT DOCUMENTS

JP          07219756 A   8/1995
JP       2001154835 A   6/2001
(Continued)

OTHER PUBLICATIONS

International Search Report (ISR) dated May 14, 2013 issued in International Application No. PCT/JP2013/060528.
Yoshiki Higo, et al, "Tutorial: An Introduction to Code Clone Refactoring", Computer Software, Oct. 25, 2011, vol. 28, No. 4, pp. 45 and 46.

*Primary Examiner* — Isaac T Tecklu
(74) *Attorney, Agent, or Firm* — Holtz, Holtz & Volek PC

(57) ABSTRACT

A structure analysis device comprises a storage means wherein modules are stored, and an analysis means for carrying out a structural analysis of a prescribed subject module of the modules which are stored in the storage means. If a hierarchical structure of a first subject range and a hierarchical structure of a second subject range of the subject module are the same, the analysis means creates similarity notification information in association with the first subject range and/or the second subject range. The first subject range and the second subject range are respectively different subject ranges of the subject ranges of the subject modules which are acquired from the storage means. The similarity notification information denotes that respectively similar subject ranges are present in the subject module.

12 Claims, 17 Drawing Sheets

(56) References Cited

U.S. PATENT DOCUMENTS

2009/0217248 A1* 8/2009 Bently et al. .................. 717/132
2010/0153923 A1* 6/2010 Kawahito ...................... 717/124

FOREIGN PATENT DOCUMENTS

JP     2009086922 A    4/2009
JP     2010140434 A    6/2010

* cited by examiner

32

| MODULE ID | LINE NUMBER | HIERARCHY ID | | OPERATION ID | | | SEQUENCE NUMBER | SECONDARY SENTENCE |
|---|---|---|---|---|---|---|---|---|
| | | BRANCH HIERARCHY | HIERARCHY DEPTH | OPERATION NAME | CONDITIONAL OPERATION | PROCESSING OPERATION | | |
| XXX | 1 | 1 | 1 | | | | 002400 | MAIN-S. |
| XXX | 2 | 1 | 1 | | | | 002500 | * |
| XXX | 3 | 1 | 1 | | | | 002600 | *#P   PERFORM  PGMAAAP-PROC. |
| XXX | 4 | 1 | 1 | | | | 006400 | ************************************ |
| XXX | 5 | 1 | 1 | | | | 006500 | *G   CALL  AAA PROGRAM |
| XXX | 6 | 1 | 1 | | | | 006600 | *G |
| XXX | 7 | 1 | 1 | | | | 006700 | ************************************ |
| XXX | 8 | 1 | 1 | | | | 006800 | PGMAAAP-PROC |
| XXX | 9 | 1 | 1 | | | | 006900 | PGMAAAP-SECTION-010. |
| XXX | 10 | 1 | 1 | | | | 007000 | *#C   CALL 'AAA'  USING WK-A-I WK-A-O. |
| AAA | 11 | 1 | 1 | | | | 001500 | MAIN-S. |
| AAA | 12 | 1 | 1 | | | | 001600 | * |
| AAA | 13 | 1 | 1 | MOVE | | ○ | 001700 |     MOVE  WK-A-I    TO  WK-C-I |
| AAA | 14 | 1 | 1 | | | | 001800 | *#C   CALL 'CCC'  USING WK-C-I WK-C-O. |
| CCC | 15 | 1 | 1 | | | | 001200 | MAIN-S. |
| CCC | 16 | 1 | 1 | | | | 001300 | * |
| CCC | 17 | 1 | 1 | IF | ○ | | 001400 |     IF  WK-C-I = 1 |
| CCC | 18 | 1.1 | 1.1 | THEN | ○ | | 001500 |         THEN |
| CCC | 19 | 1.1 | 1.1 | MOVE | | ○ | 001600 |         MOVE  1  TO  WK-C-O |
| CCC | 20 | 1.2 | 1.1 | ELSE | ○ | | 001700 |         ELSE |
| CCC | 21 | 1.2 | 1.1 | IF | ○ | | 001800 |         IF  WK-C-I = 2 |
| CCC | 22 | 1.2.1 | 1.1.1 | THEN | ○ | | 001900 |             THEN |
| CCC | 23 | 1.2.1 | 1.1.1 | COMPUTE | | ○ | 002000 |             COMPUTE  WK-C = WK-C-I * 10 |
| CCC | 24 | 1.2.1 | 1.1.1 | MOVE | | ○ | 002100 |             MOVE  WK-C  TO  WK-C-O |
| CCC | 25 | 1.2.2 | 1.1.1 | ELSE | ○ | | 002200 |             ELSE |
| CCC | 26 | 1.2.2 | 1.1.1 | MOVE | | ○ | 002300 |             MOVE  9  TO  WK-C-I |
| CCC | 27 | 1.2.2 | 1.1.1 | | | | 002400 | *#O             COMPUTE WK-C = |
| CCC | 28 | 1.2.2 | 1.1.1 | | | | 002500 | *#O                       WK-C-I * 5 - 5 |
| CCC | 29 | 1.2.2 | 1.1.1 | COMPUTE | | ○ | T00000 |             COMPUTE WK-C = WK-C-I * 5 - 5 |
| CCC | 30 | 1.2.2 | 1.1.1 | MOVE | | ○ | 002600 |             MOVE WK-C  TO  WK-C-O |
| CCC | 31 | 1.2 | 1.1 | END-IF | ○ | | 002700 |         END-IF |
| CCC | 32 | 1 | 1 | END-IF | ○ | | 002800 |     END-IF. |
| CCC | ... | | | | | | 003000 | * |
| XXX | 141 | 1 | 1 | END-IF | ○ | | 005100 |     END-IF |
| XXX | 142 | 1 | 1 | | | | 005200 | * |
| XXX | 143 | 1 | 1 | | | | 005300 | *#P   PERFORM   AAA-SUB. |
| XXX | 144 | 1 | 1 | | | | 005700 | * |
| XXX | 145 | 1 | 1 | | | | 005800 | AAA-SUB         SECTION. |
| XXX | 146 | 1 | 1 | | | | 005900 | AAA-SUB-S. |
| XXX | 147 | 1 | 1 | MOVE | | ○ | 006000 |     MOVE  WK-X    TO  WK-XXX. |
| XXX | 148 | 1 | 1 | DISPLAY | | ○ | 006100 |     DISPLAY WK-XXX   UPON  SYSOUT. |
| XXX | 149 | 1 | 1 | | | | 006200 | AAA-SUB-E. |
| XXX | 150 | 1 | 1 | EXIT | | ○ | 006300 |     EXIT. |
| XXX | 151 | 1 | 1 | | | | 005400 | * |
| XXX | 152 | 1 | 1 | | | | 005500 | MAIN-E. |
| XXX | 153 | 1 | 1 | STOP | | ○ | 005600 |     STOP RUN. |

Annotations: CALL-statement, EXPANSION(AAA), EXPANSION(CCC), PERFORM-statement, EXPANSION(AAA-SUB)

327 hierarchy level 329p

A
| | | |
|---|---|---|
| IF  WK-C-I = 1 | 1 | 1 2 3 2 1 |
| THEN | 2 | |
|     MOVE  1  TO  WK-C-O | | |
| ELSE | 2 | |
| IF  WK-C-I = 2 | 2 | 1 2 1 |

FIG. 12

| Line number | 2 | 3 | 4 | 5 | 6 |
|---|---|---|---|---|---|
| 33 | 002100 MAIN-E. | | | | |
| 34 | 002200 GOBACK. | | | | |
| 40 | 007100 PGMAAAP-PROC-999. | | | | |
| 41 | 007200 EXIT. | | | | |
| 42 | | | | | |
| 43 | 002800*#E | EVALUATE WK-A-O | | | |
| 44 | 002900*#E | WHEN CS-1 | | | |
| 45 | W00001 F(WK-A-O=CS-1) | | F(WK-A-O=CS-2) | | |
| 46 | W00002 THEN MOVE CS-1 TO WK-B-1 | W00003 ELSE | | | |
| 47 | | 003100*#E WHEN CS-2 | | | |
| | W00004 | W00005 THEN MOVE CS-2 TO WK-B-1 | W00006 ELSE F(WK-A-O=CS-3) | | |
| | | | 003300*#E WHEN CS-3 | | |
| | | | W00007 | W00008 THEN MOVE CS-3 TO WK-B-1 | W00009 ELSE F(WK-A-O=CS-4) |
| | | | | | 003500*#E WHEN CS-4 |
| | | | | W00010 | W00011 THEN MOVE CS-4 TO WK-B-1 | W00012 ELSE |
| | | | | | 003700*#E WHEN OTHER |
| | | | | | 003800 MOVE 9 TO WK-B-1 |
| | | | | | 003900*#E END-EVALUATE. |
| | | | | W00013 END-F | |
| | | | W00014 END-F | | |
| | | W00015 END-F | | | |
| 70 | W00016 END-F | | | | |
| 71 | 004000 | | | | |

COLUMN → 
ROW ↓

FIG. 17 hierarchy pattern (329p): 1 2 3 4 3 4 5 4 3 2 1

| line number (322) | code | hierarchy level | similarity existence (329f) |
|---|---|---|---|
| first target range (R1) | | | |
| 874 | IF (W02-BEYM NOT = SPACE) AND (W02-BEYM >= WK-MIYM2) | 1 | 1 |
| 875 | THEN | 2 | |
| 878 | MOVE '1' TO WK-ICBSS(CT-5) | 2 | |
| 879 | ELSE | 2 | |
| 882 | IF (W04-IAT(CT-5) = ZERO) AND (W04-GSM(CT-5) = ZERO) | 2 | |
| 883 | THEN | 3 | |
| 884 | IF WK-SSCNS = '1' | 3 | |
| 885 | THEN | 4 | |
| 888 | MOVE '2' TO WK-ICBSS(CT-5) | 4 | |
| 889 | ELSE | 4 | |
| 892 | MOVE '1' TO WK-ICBSS(CT-5) | 4 | |
| 893 | END-IF | 3 | |
| 894 | ELSE | 3 | |
| 901 | IF WK-SSS = '1' | 3 | |
| 902 | THEN | 4 | |
| 905 | IF WK-GSP >= WK-MIYM2 | 4 | |
| 906 | THEN | 5 | |
| 909 | MOVE '1' TO WK-ICBSS(CT-5) | 5 | |
| 910 | ELSE | 5 | |
| 911 | CONTINUE | 5 | |
| 912 | END-IF | 4 | |
| 913 | ELSE | 4 | |
| 914 | | | |
| 915 | END-IF | 3 | |
| 920 | END-IF | 2 | |
| 921 | END-IF | 1 | |
| second target range (R2) | | | |
| 2397 | IF WK-ICSYM(CT-5) = HZKC06-AYMD(1:6) | 1 | 1 |
| 2398 | THEN | 2 | |
| 2399 | MOVE '1' TO WK-TIS | 2 | |
| 2400 | ELSE | 2 | |
| 2401 | IF WK-SSCNS = '1' | 2 | |
| 2402 | THEN | 3 | |
| 2405 | IF (W04-IAT(CT-5) = ZERO) AND (TB-JD(CT-5 1) > '1') | 3 | |
| 2406 | THEN | 4 | |
| 2407 | MOVE '2' TO WK-TIS | 4 | |
| 2408 | ELSE | 4 | |
| 2409 | CONTINUE | 4 | |
| 2410 | END-IF | 3 | |
| 2411 | ELSE | 3 | |
| 2412 | IF WK-SSS = '1' | 3 | |
| 2413 | THEN | 4 | |
| 2414 | INITIALIZE HZKC06-DCIF | 4 | |
| 2415 | MOVE '2' TO HZKC06-CND1 | 4 | |
| 2416 | MOVE '1' TO HZKC06-CND2 | 4 | |
| 2419 | | | |
| 2420 | MOVE '+' TO HZKC06-CLC | 4 | |
| 2421 | MOVE '001' TO HZKC06-CLM | 4 | |
| 2423 | PERFORM HZKC06P-PROC | 4 | |
| 2427 | IF WK-ICSYM(CT-5) = HZKC06-AYMD(1:6) | 4 | |
| 2428 | THEN | 5 | |
| 2429 | MOVE '1' TO WK-TIS | 5 | |
| 2430 | ELSE | 5 | |
| 2431 | CONTINUE | 5 | |
| 2432 | END-IF | 4 | |
| 2433 | ELSE | 4 | |
| 2434 | CONTINUE | 4 | |
| 2435 | END-IF | 3 | |
| 2436 | END-IF | 2 | |
| 2437 | END-IF. | 1 | |

STRUCTURE ANALYSIS DEVICE AND PROGRAM

TECHNICAL FIELD

This invention relates to a device for supporting structural analysis of a module (source program) including one or more sentences written in a program language.

BACKGROUND ART

When a program is developed, structured programming is strongly recommended. Specifically, for example, a module is required to be made by combining processing sections each including relatively few sentences. Moreover, the module is required not to use unconditional branch statements (GOTO statements) but to be provided with nested structure (i.e. hierarchical structure) formed with conditional statements and repeat statements. Moreover, a process common to a plurality of the modules is required to be modularized. Accordingly, for example, when a system includes programs whose total sum of sentences is over one million, the system often includes several thousand modules each having several ten processing sections.

In such a large-scale system as described above, persons involved in development thereof, or persons who sufficiently know the relation among the modules and the structure of each of the modules, often maintain the system for a while after the development. However, such a system is often used over several ten years while being repeatedly maintained. As time passing by, the persons involved in the development are gone so that persons who do not know the structures of the modules are required to maintain the system. In such a case, because the structured programming is used, they are forced to figure out the functions each of which is described separately in a large amount of the modules so that the maintenance becomes extremely difficult. In other words, structural analysis of the module becomes difficult.

In order to understand the function of the whole module or the function of each processing section, it is necessary to figure out the hierarchical structure formed with the conditional statements (hereafter, simply referred to as "hierarchical structure"). However, the module in the large-scale system often has deep hierarchical structure (for example, hierarchical structure having ten or more hierarchies). In such a case, it is not easy to figure out its hierarchical structure. Accordingly, for example, a part similar to a maintained part (for example, a part having similar function) may be missed so that a necessary maintenance is not done.

As can be seen from the above explanation, a system can be more easily and more properly maintained if its hierarchical structure can be easily figured out. Moreover, by finding out parts having hierarchical structures same as each other, maintenance for the similar part can be prevented from being missed. For example, each of Patent Document 1 and Patent Document 2 discloses a technique which supports for figuring out the hierarchical structure.

Patent Document 1 discloses a program development support device which changes, when displaying a program (module), display color of a statement according to its depth in nested structure (i.e. hierarchical structure) formed with IF-statements. Accordingly, a program developer can visually figure out the hierarchical structure. According to a structure program compiling apparatus disclosed in Patent Document 2, when a program (module) is displayed, a statement including keyword that indicates hierarchy (for example, if or case) is displayed while other statement can be undisplayed or can be simply displayed. Accordingly, a program developer can relatively easily figure out the hierarchical structure.

PRIOR ART DOCUMENTS

Patent Document(s)

Patent Document 1: JP A H7(1995)-219756
Patent Document 2: JP A 2001-154835

SUMMARY OF INVENTION

Technical Problem

However, even when any of the techniques disclosed in Patent Document 1 and Patent Document 2 is used, a program developer is finally required to figure out a hierarchical structure of a module. More specifically, it is required to do a difficult and cumbersome work of figuring out a hierarchical structure of a part necessary to be maintained and finding out another part similar thereto from a large amount of the modules.

It is therefore an object of the present invention to provide a structure analysis device which finds out parts having hierarchical structures same as each other in a module to support for figuring out the hierarchical structure.

Solution to Problem

One aspect of the present invention provides a structure analysis device which performs structure analysis of a module including one or more sentences written in a program language. The module is able to have conditional statements described therein, wherein the conditional statement is a kind of the sentence. The conditional statement includes an executable-on-satisfaction statement and/or an executable-on-failure statement therewithin. The executable-on-satisfaction statement is the sentence that is executed when a conditional expression of the conditional statement is satisfied. The executable-on-failure statement is the sentence that is executed when the conditional expression is not satisfied. At least one of the conditional statements is also able to include the conditional statement therewithin as the executable-on-satisfaction statement and/or as the executable-on-failure statement so that the conditional statements enable a hierarchization of the sentences. The hierarchization forms a specifiable hierarchical structure for each of a plurality of target ranges each of which includes a series of the sentences in the module. The structure analysis device comprises a storage means and an analyzing means. The storage means stores one or more of the modules. The analyzing means is to perform structure analysis of a predetermined target module among the modules stored in the storage means. The analyzing means has an obtaining function and an analyzing function. The obtaining function is a function to obtain the target module from the storage means. The analyzing function is a function that creates, when the hierarchical structure of a first target range is same as the hierarchical structure of a second target range, a similarity notifier in association with the first target range and/or the second target range. The first target range and the second target range are the target ranges different from each other among the target ranges in the obtained target module. The similarity notifier notifies an existence of the target ranges similar to each other in the target module.

Another aspect of the present invention provides a program which makes a computer function as the structure analysis devices.

Advantageous Effects of Invention

According to the present invention, when a module includes parts (target ranges) similar to each other, a similarity notifier is created in association with the target ranges. Accordingly, with reference to the similarity notifier, the target ranges similar to each other can be easily found out.

Moreover, when a plurality of the modules in a system is combined to be analyzed, the target ranges similar to each other in the huge module can be more easily found out.

An appreciation of the objectives of the present invention and a more complete understanding of its structure may be had by studying the following description of the preferred embodiment and by referring to the accompanying drawings.

BRIEF DESCRIPTION OF DRAWINGS

FIG. 12 is a diagram partially showing an example of the secondary module of FIG. 9.

FIG. 13 is a diagram partially showing an example of a flowchart stored in the storage device of FIG. 9.

FIG. 17 is diagram partially showing another example of the secondary module of FIG. 9.

DESCRIPTION OF EMBODIMENTS

Figure 1:
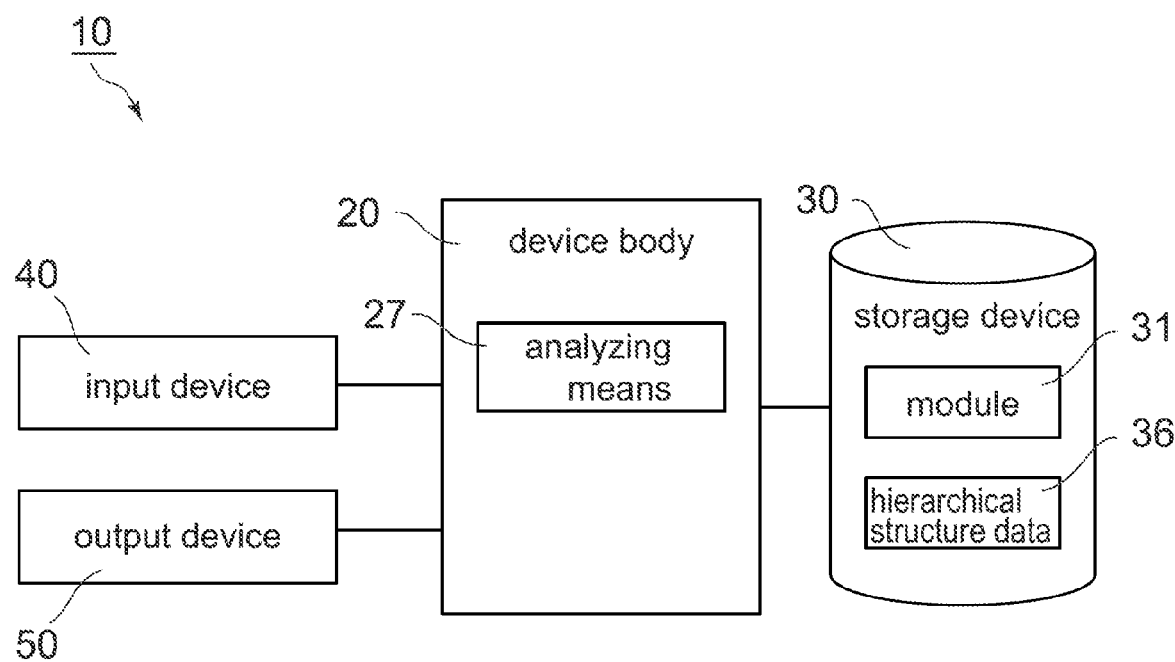
FIG. 1 is a block diagram showing a structure analysis device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, a structure analysis device 10 according to a first embodiment of the present invention comprises a device body 20, a storage device (storage means) 30, an input device 40 and an output device 50. The structure analysis device 10 is to perform structure analysis of a module (source program) including one or more sentences written in a program language.

The program language according to the present embodiment is COBOL. However, the present invention is also applicable for a program language other than COBOL.

The module according to the present embodiment can be identified by a module name which is formed of combined letters, digits, symbols, and so on.

The module can include one or more processing sections described therein, wherein the processing section includes one or more of the sentences. The processing section according to the present embodiment is section in COBOL. Each section can be identified by a section name (processing section name). However, the processing section does not need to be the section. For example, when the program language is JAVA (registered trademark in Japan), the processing section may be a function which can be identified by a function name (processing section name).

The module can call the other modules or this module itself. Moreover, the section of the module can perform the other sections or this section itself. More specifically, the module can include a processing-section perform statement and a module call statement described therein as the sentences, wherein the processing-section perform statement is to identify and perform the section by using the section name, and the module call statement is to identify and perform one of the modules by using the module name. According to the present embodiment, the processing-section perform statement is PERFORM-statement, and the module call statement is CALL-statement. In another program language, each of the processing-section perform statement and the module call statement is, for example, a statement which specifies the function name. When the module call statement is the statement specifying the function name, the specified function of the module (i.e. a part of the module) is executed by the module call statement. In this case, the module name does not need to be explicitly described in the module call statement. In other words, the module name may be indirectly specified by the function name.

Moreover, the module can have conditional statements described therein, wherein the conditional statement is a kind of the sentence. The conditional statement has a conditional expression so that an executable-on-satisfaction statement and/or an executable-on-failure statement can be described in the conditional statement. In other words, the conditional statement can include the executable-on-satisfaction statement and/or the executable-on-failure statement. The executable-on-satisfaction statement is the sentence that is executed when the conditional expression of the conditional statement is satisfied. The executable-on-failure statement is the sentence that is executed when the conditional expression is not satisfied. The conditional statements according to the present embodiment are IF-statement and EVALUATE-statement. In IF-statement, the executable-on-satisfaction statement is the sentence described subordinate to THEN phrase while the executable-on-failure statement is the sentence described subordinate to ELSE phrase. Similarly, in EVALUATE-statement, the executable-on-satisfaction statement is the sentence described subordinate to WHEN phrase.

At least one of the conditional statements according to the present embodiment also can include the conditional statement therewithin as the executable-on-satisfaction statement and/or as the executable-on-failure statement so that the conditional statements enable a hierarchization of the sentences. For example, IF-statement also can be described as the executable-on-failure statement of IF-statement. In other words, the module comprises one or more of the sentences which can be nested with the conditional statement so that the module has a predetermined hierarchical structure (i.e. hierarchical structure with conditional statements). As can be seen easily, for each of a plurality of parts (target ranges) each of which includes a series of the sentences in the module, the hierarchization forms a specifiable hierarchical structure.

As shown in FIG. 1, the storage device 30 is a magnetic disk unit, for example. The storage device 30 can store various files which are hierarchized, for example, with folders (not shown). The storage device 30 is communicatively coupled to the device body 20 to be able to read (obtain) and write (store) the file in accordance with an instruction from the device body 20. The storage device 30 according to the present embodiment stores one or more of modules 31. Moreover, the storage device 30 can store hierarchical structure data 36.

The module 31 is created by using a programming tool (not shown), for example. Each of the modules 31 may be a single file. Alternatively, a plurality of modules 31 may be stored as a single file. The hierarchical structure data 36 are for storing the respective hierarchical structures of one or more of the target ranges included in the module 31. According to the present embodiment, the hierarchical structure data 36 are created for the respective module 31.

The input device 40 is a keyboard or a mouse, for example. The input device 40 is communicatively coupled to the device body 20 to be able to notify a character input from the keyboard or a position indicated by the mouse to the device body 20.

The output device 50 is a display or a printer, for example. The output device 50 is communicatively coupled to the device body 20 to be able to display or print data (for example, a character or a figure) transmitted from the device body 20.

The device body 20 is a main body of a personal computer (PC), for example. The device body 20 has a central processing unit (CPU), a primary storage device and so on (not shown). The storage device 30 stores executable files of various programs (not shown). CPU loads the executable files into the primary storage device to perform various functions by executing instructions in each of the executable files. During a process where CPU executes the instructions, a predetermined file stored in the storage device 30 is read into a variable region of the program via a buffer area in the primary storage device. The content of the file read into the variable region of the program is written into the storage device 30 via the buffer area of the primary storage device as necessary. As can be seen from the above explanation, each of the storage device 30 and the primary storage device functions as a read-able and writable storage means according to the present embodiment. In other words, the storage means according to the present embodiment may be one of the storage device 30 and the primary storage device, or may be both of them. In the following explanation, the storage device 30 is used as the storage means.

The storage device 30 according to the present embodiment stores various programs such as an analyzing program (not shown). The aforementioned programs are loaded into the primary storage device and executed by CPU so that the computer functions as various means (i.e. as devices). For example, the analyzing program makes the computer function as an analyzing means 27 (structure analysis device 10) that performs structure analysis of a predetermined target module 31 among the modules 31 stored in the storage device 30. In other words, the device body 20 of the structure analysis device 10 according to the present embodiment comprises the analyzing means 27.

Figure 2:
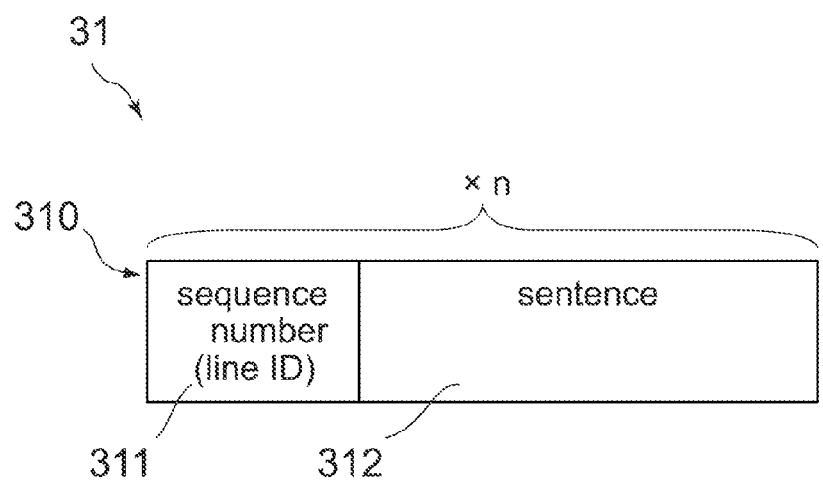
FIG. 2 is a diagram schematically showing a structure of a file of a module stored in a storage device of the structure analysis device of FIG. 1.

As shown in FIG. 2, the module 31 according to the present embodiment is composed of n (n≥1) lines 310. The module 31 according to the present embodiment is a text file. However, the module 31 may be a worksheet of MICROSOFT EXCEL (registered mark), for example. In a case where the module 31 is the worksheet, the analyzing means 27 can be made with EXCEL macro, for example. The line 310 is composed of at least a sequence number (line ID) 311 and a sentence 312. The sequence number 311 is for identifying the line 310 and for determining order of the lines 310. The sequence number 311 may include characters or symbols as well as digits. The sentence 312 has the statement (for example, a data definition statement, an executable statement or a comment statement) which is described therein. The sentence 312 may have a complete single statement wholly described therein. Alternatively, the single statement may be partially described in the sentence 312. For example, MOVE-statement may be separately described in the sentences 312 of the two lines 310.

Figure 3:
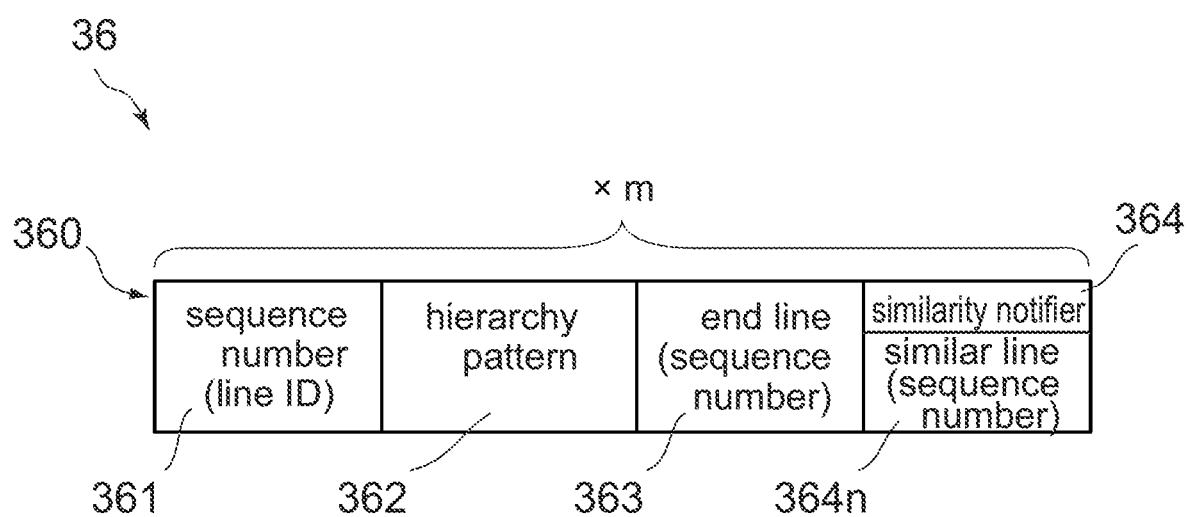
FIG. 3 is a diagram schematically showing a structure of a file of a hierarchical structure data stored in the storage device of FIG. 1.

As shown in FIG. 3, the hierarchical structure data 36 according to the present embodiment is composed of m (m≥1) lines 360. The hierarchical structure data 36 according to the present embodiment is a worksheet of MICROSOFT EXCEL (registered mark). However, the hierarchical structure data 36 may be a text file, for example. The hierarchical structure data 36 is created via analysis, which is done by the analyzing means 27 about the hierarchical structure of the module 31, and stored in association with the module 31. Specifically, for example, the hierarchical structure data 36 has a file name same as a file name of the corresponding module 31. Alternatively, the module 31 and the hierarchical structure data 36 corresponding to each other may be different worksheets of a common workbook.

The line 360 of the hierarchical structure data 36 is composed of a sequence number (line ID) 361, a hierarchy pattern 362, an end line (sequence number) 363 and a similarity notifier 364. The similarity notifier 364 according to the present embodiment includes a similar line (sequence number) 364n. The sequence number 361 is set to the sequence number 311 of the corresponding module 31. The end line 363 is set to the sequence number 311 of the line 310 at which a target range (i.e. a range which is a target of analysis about the hierarchical structure) ends, wherein the target range starts from the sequence number 361 in the module 31. The hierarchy pattern 362 is set to data which enables the hierarchical structure of the target range from the sequence number 361 to the end line 363 to be identified. The similarity notifier 364 is set to data which notifies existence of the target ranges similar to each other in the module 31. More specifically, the similar line 364n according to the present embodiment is set to the sequence number 361 of the line 360 which has the hierarchy pattern 362 same as the hierarchy pattern 362 of this line 360.

Figure 4:
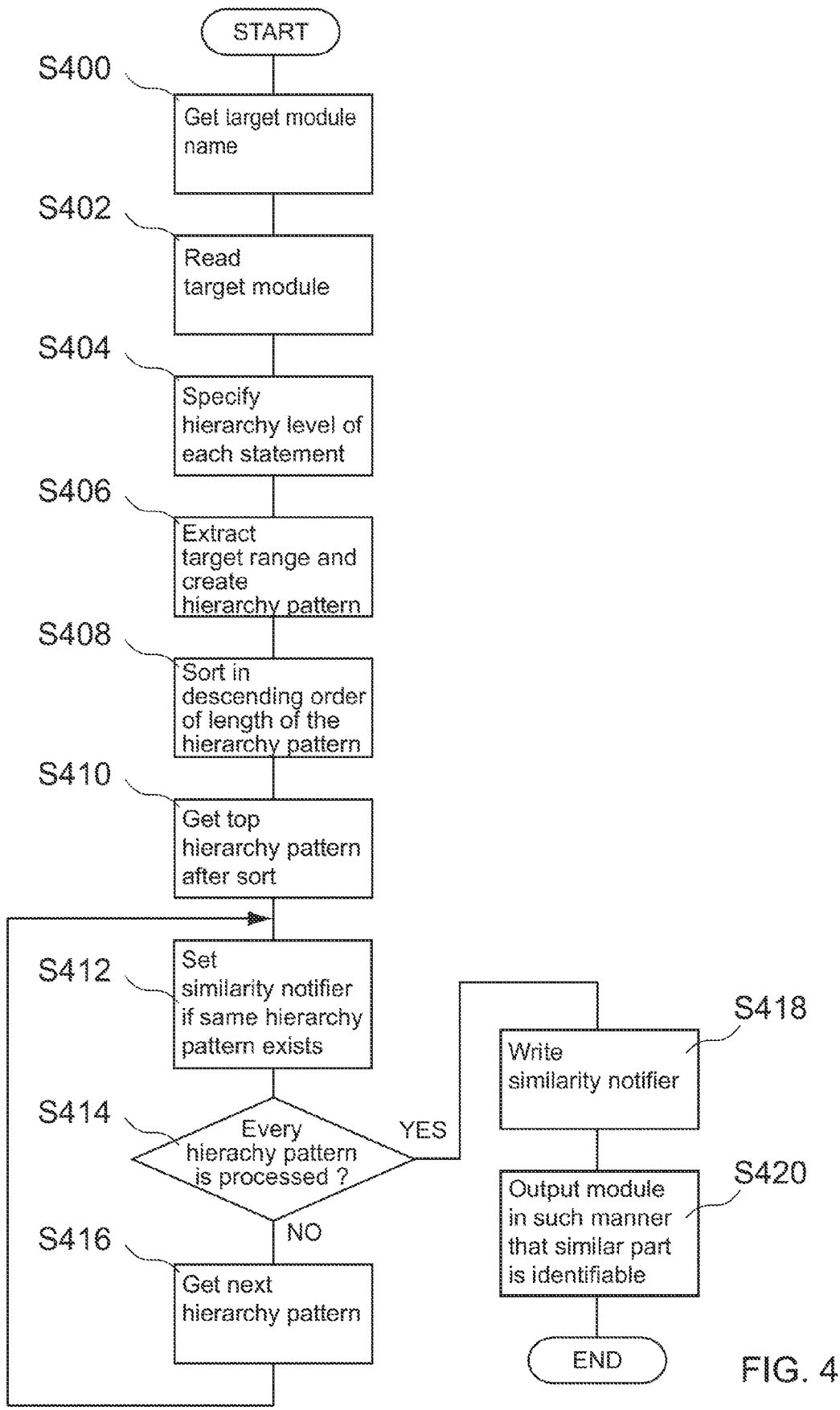
FIG. 4 is a flowchart showing functions of an analyzing means of the structure analysis device of FIG. 1.

Hereafter, by using FIG. 4 while referring to examples shown in FIGS. 5 to 8, explanation is made in detail about the function and the process of the structure analysis device 10 according to the present embodiment. First, explanation is made about an example in which the module 31 includes only IF-statement as the conditional statement (see FIGS. 5 and 6). Then, explanation is made about another example in which the module 31 includes the conditional statement other than IF-statement (see FIG. 8).

As can be seen from FIG. 4, the analyzing means 27 according to the present embodiment has an obtaining function (S400 and S402), an analyzing function (S404 to S416), a write function (S418) and an output function (S420). The obtaining function is a function to obtain the target module 31 to be processed among the modules 31 from the storage device 30 (or the primary storage device). The analyzing function is a function to analyze the hierarchical structure of the target module 31. The write function is a function to store the target module 31 and the hierarchical structure data 36 (hence the similarity notifier 364) into the storage device 30 while associating them with each other. The output function is a function to output the target module 31 and the similarity notifier 364 to the output device 50 while associating them with each other.

In detail, the analyzing means 27 is activated, for example, by a start instruction input from the input device 40 and gets a target module name to identify the target module 31 (S400). The target module name can be input, for example, as a part of the start instruction. The analyzing means 27 reads the target module 31 that is identified by the obtained target module name from the storage device 30 (S402). At that time, for example, only the module 31 stored in a predetermined folder may be the target to be read. If the target module 31 is not stored in the storage device 30, the analyzing means 27 ends its process (not shown).

Then, the analyzing means 27 specifies a hierarchy level of each statement of the target module 31 (S404). Specifically, the analyzing means 27 gets the lines 310 of the target module 31 sequentially from the first line to the last line while applying the hierarchy level to each of the lines 310. At that time, the analyzing means 27 adjusts the hierarchy level of the first line to 1 and increments the hierarchy level in each time when THEN phrase of IF-statement is found. Moreover, the analyzing means 27 decrements the hierarchy level in each time when END-IF of IF-statement (i.e. the end of IF-statement) is found. Under a case where the description of THEN phrase or END-IF can be omitted, the increment or the decrement of the hierarchy level can be done by analyzing, for example, the sequence of the statements in IF-statement.

Figure 5:
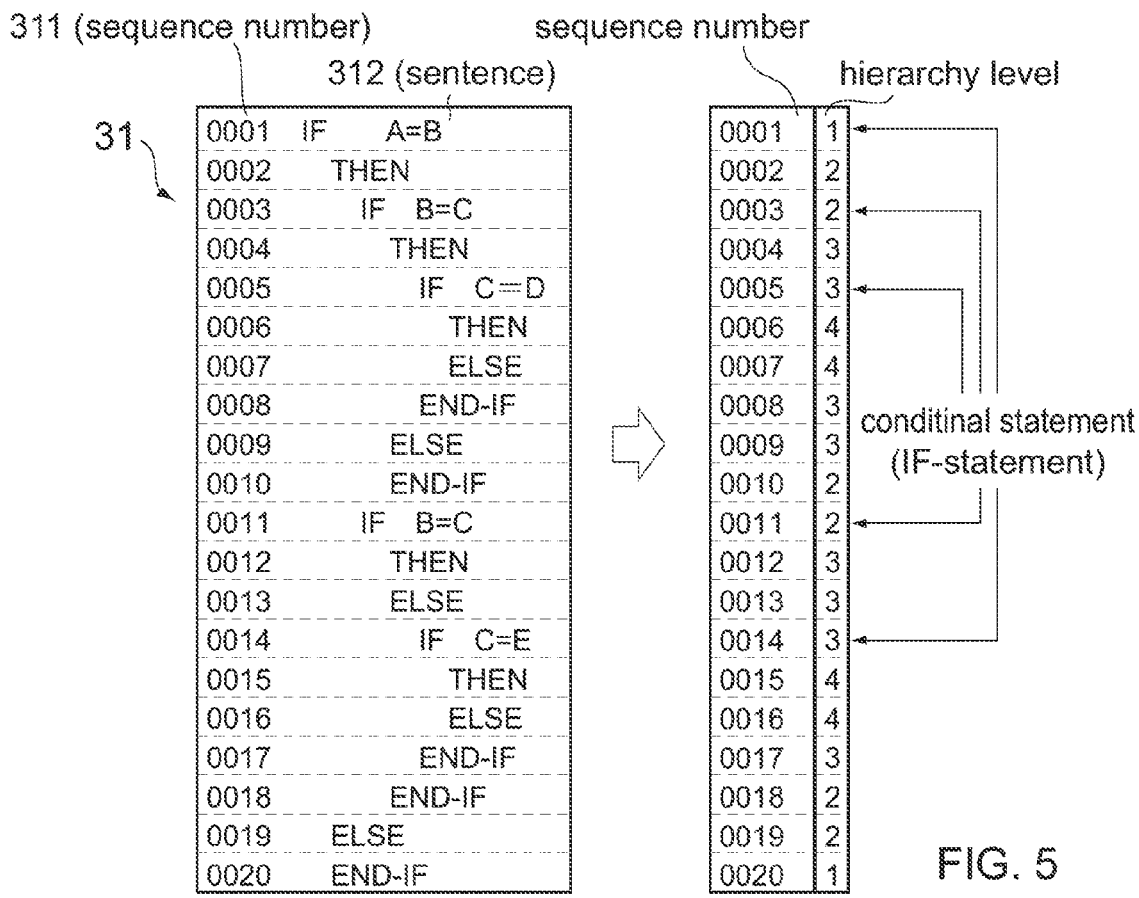
FIG. 5 is a diagram showing, with use of an example, the former part of an analyzing process of the analyzing means of FIG. 4.

For example, referring to the target module 31 shown in FIG. 5 as an example, the hierarchy level of the top sentence 312 (the sentence 312 having the sequence number of 0001) is 1, and hierarchy level of the subsequent THEN phrase is 2. According to the aforementioned case, the hierarchy level is a numerical value, and the analyzing means 27 increment the hierarchy level by 1 in each time when THEN phrase is found while decrementing the hierarchy level by 1 in each time when END-IF is found. However, the hierarchy level does not need to be a numerical value, provided that depth of the hierarchy level can be compared. Moreover, it is sufficient that the hierarchy level updated upon detection of THEN phrase is designed to return to the value before the update upon detection of the corresponding END-IF. It is sufficient that the hierarchy level is applied to the executable statement.

In particular, it is sufficient that the hierarchy level is applied to the top line and the end line of IF-statement, and the line where THEN phrase or ELSE phrase is described. Accordingly, it is sufficient that the analyzing means 27 applies the hierarchy level for a range from the top executable statement to the last executable statement in the target module 31.

Then, the analyzing means 27 extracts a target range, or a range which is to be a target for analyzing its hierarchical structure (S406). In detail, the analyzing means 27 finds a start line and an end line for each of the conditional statements included in the target module 31. The analyzing means 27 uses the range between the found start line and end line as the target range. The analyzing means 27 ends its process (not shown) if the target module 31 includes no conditional statement or if the target module 31 includes only one conditional statement. As can be seen from the above explanation, according to the present embodiment, the target range includes at least one of the conditional statements. Moreover, for each of the conditional statements included in the target range, the target range wholly includes it from start to end thereof. However, the target range may start from before the conditional statement or from middle of the conditional statement.

Referring to the target module 31 shown in FIG. 5 as the example, IF-statements (conditional statements) start from the lines 310 having the sequence numbers 311 of 0001, 0003, 0005, 0011 and 0014, respectively. Furthermore, IF-statements end at the lines 310 having the sequence numbers 311 of 0020, 0010, 0008, 0018 and 0017, respectively. As shown in the upper part of FIG. 6, the start lines and the end lines that are found as described above are used as the start lines and the end lines of the respective target ranges.

The analyzing means 27 creates a hierarchy pattern for each of the extracted target ranges (S406). Specifically, for each of the conditional statements, the analyzing means 27 combines the hierarchy levels from the start line to the end line to create a hierarchy pattern (before compression). Subsequently, the analyzing means 27 compresses the successive same hierarchy levels in the hierarchy pattern (before compression) to create a hierarchy pattern (after compression).

Figure 6:
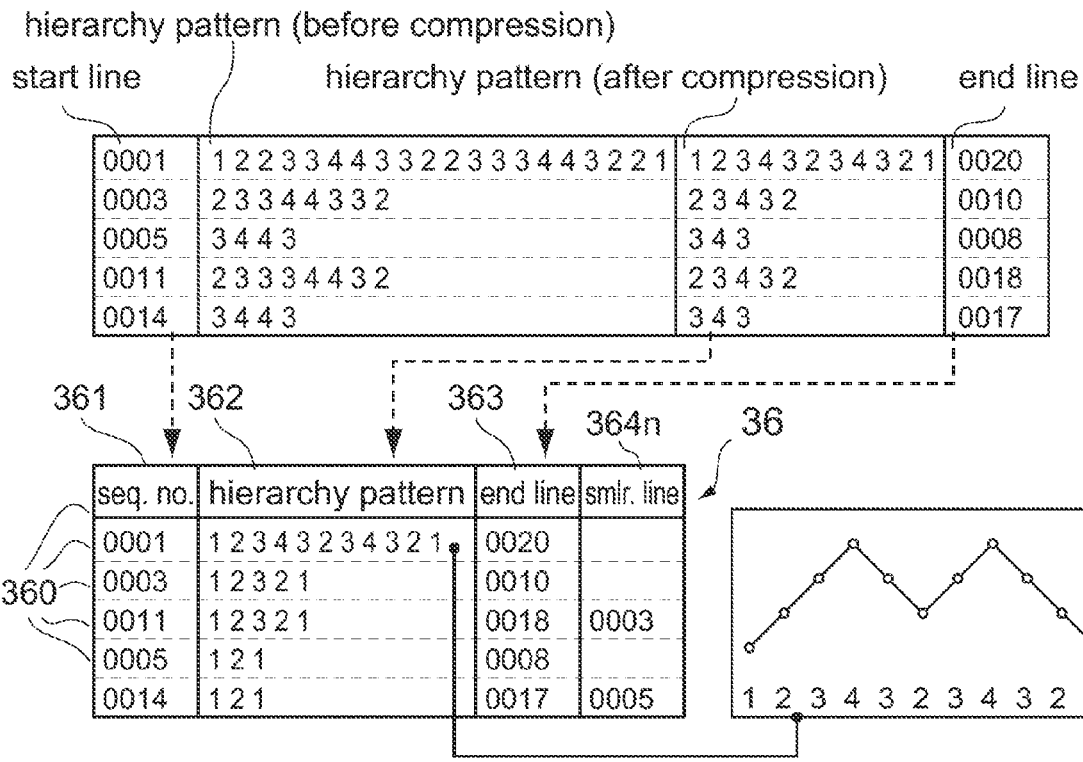
FIG. 6 is a diagram showing, with use of the example, the latter part of the analyzing process of the analyzing means of FIG. 4.

As shown in the upper part of FIG. 6 with reference to the target module 31 in FIG. 5, for example, as for IF-statement having the start line of 0001 and the end line of 0020, the hierarchy levels: 1, 2, 2, 3 . . . 3, 2, 2, 1 (see the hierarchy levels in FIG. 5) are combined in this order so that the hierarchy pattern (before compression) is created. Subsequently, the successive same hierarchy levels in the hierarchy pattern (before compression) are compressed into a single hierarchy level so that the hierarchy pattern (after compression) is created.

As can be seen from the above explanation, the hierarchy level according to the present embodiment is for indicating a hierarchy depth specified based on the sentence at top of the target range. Moreover, the hierarchical structure of the target range can be identified by the hierarchy pattern that is a combination of the hierarchy levels involved in the target range.

As shown in the lower part of FIG. 6, the analyzing means 27 sets the sequence number 361, the hierarchy pattern 362 and the end line 363 of the hierarchical structure data 36 to the start line, the hierarchy pattern (after compression) and the end line of the target range found out as described above, respectively (a part of the process in S406). In other words, one or more of the target ranges are stored into the hierarchical structure data 36, wherein each of the target ranges is identifiable by using the sequence number 361, the hierarchy pattern 362 and the end line 363. At that time, the hierarchy pattern 362 is normalized to indicate hierarchy depth specified based on the top sentence (i.e. IF-statement) of the target range. Specifically, for example, "2 3 4 3 2" is normalized into "1 2 3 2 1". As can be seen from the schematic diagram in the lower right part of FIG. 6, the hierarchy pattern 362 created as described above can be compared to a terrain of a mountain. In this comparison, each of the hierarchy levels combined into the hierarchy pattern 362 shows height relative to the base of the mountain.

Then, the analyzing means 27 sorts the lines 360 of the created hierarchical structure data 36 in descending order of length of the hierarchy pattern 362, or the number of the hierarchy levels combined into the hierarchy pattern 362 (S408). If some hierarchy patterns 362 have the same length, the analyzing means 27 sorts them, for example, in ascending order of the sequence number 361. The lower part of FIG. 6 shows the sorted hierarchical structure data 36 as an example. Referring to the example in the lower part of FIG. 6, for example, the hierarchy pattern 362 of "1 2 3 4 3 2 3 4 3 2 1" has length of 11. Because this hierarchy pattern 362 has the maximum length among the five hierarchy patterns 362, it is sorted to be placed in the first line of the hierarchical structure data 36.

Then, the analyzing means 27 selects two of the target ranges different from each other, namely, a first target range and a second target range, among the target ranges of the created hierarchical structure data 36 (i.e. the target ranges in the target module 31). The analyzing means 27 creates the similarity notifier 364 in association with the second target range if the hierarchical structure of the first target range is same as the hierarchical structure of the second target range (S410 to S416). More specifically, the analyzing means 27 determines, for each of the lines 360 of the created hierarchical structure data 36, whether the same hierarchy pattern 362 exists or not (S410 to S416).

In detail, the analyzing means 27 firstly gets the top hierarchy pattern 362 (in the first line 360) after the sort as the hierarchy pattern of the first target range (S410). Referring to the example in the lower part of FIG. 6, "1 2 3 4 3 2 3 4 3 2 1" is obtained.

Then, the analyzing means 27 determines whether the hierarchy pattern 362 same as the obtained hierarchy pattern 362 exists or not in the hierarchical structure data 36 (S412). In other words, the analyzing means 27 searches the second target range that is different from the first target range but has the hierarchy pattern same as that of the first target range. If the second target range exists, the analyzing means 27 sets the similar line 364n of the similarity notifier 364 of the second target range to the sequence number 361 of the first target range (S412). Referring to the example in the lower part of FIG. 6, because the hierarchy pattern 362 same as "1 2 3 4 3 2 3 4 3 2 1" does not exist, the similar line 364n of any line 360 is not set, or remains its initial value.

Then, the analyzing means 27 determines whether every hierarchy pattern 362 is processed or not (S414) and performs the process of S418 if the process is completed (YES at S414). On the other hand, if an unprocessed hierarchy pattern 362 exists (NO at S414), the analyzing means 27 gets the hierarchy pattern 362 of the next line 360 in the hierarchical structure data 36. Referring to the example in the lower part of FIG. 6, as can be seen from the above explanation, "1 2 3 2 1" is obtained. In this case, because the line 360 having the sequence number 361 of 0011 also includes the identical hierarchy pattern 362 of "1 2 3 2 1", the similar line 364n of the line 360, which has the sequence number 361 of 0011, is set to "0003" (S412).

As described above, the analyzing means 27 according to the present embodiment, in the analyzing function, sorts the hierarchy patterns 362 in the descending order of their length so as to use each of a plurality of the target ranges as the first target range in the descending order of the number of the hierarchy levels that are combined into the hierarchy pattern 362. However, the hierarchical structures can be compared without the sort. Moreover, the hierarchy levels can be compared, without creating the hierarchy pattern 362, by shifting the lines 310 of the target module 31 by one line at a time. However, in consideration of performance, it is preferable to design like the present embodiment.

As can be seen from the above explanation, the analyzing function of the analyzing means 27 according to the present embodiment determines that the hierarchical structure of the first target range and the hierarchical structure of the second target range are same as each other, or the first target range and the second target range are similar to each other, when the hierarchy pattern 362 of the first target range and the hierarchy pattern 362 of the second target range are same as each other. However, the hierarchical structures can be compared by a method different from the aforementioned method. For example, the hierarchical structures may be compared by using the hierarchy pattern (before compression) shown in FIG. 6. By doing so, the hierarchical structures can be compared more strictly. Moreover, when the hierarchy pattern (before compression) is created, the hierarchy level may also be applied to the statement (for example, MOVE-statement) other than IF-statement, THEN phrase, ELSE phrase and END-IF, and may be combined into the hierarchy pattern (before compression). By doing so, the similarity between the two target ranges can be compared still more strictly.

The similarity between the two target ranges can be compared by also using an object other than the hierarchy pattern. For example, it is possible to calculate an evaluation score from the type and the number of the used executable statements, the type and the number of the used functions and the type and the number of the used item names in the two target ranges. In this case, when the hierarchy patterns are same as each other and the calculated evaluation score is equal to or more than a predetermined score, the two target ranges can be determined to be similar to each other.

The analyzing means 27 writes the similarity notifier 364 into the storage device 30 (S418) if completing its analyzing process (S404 to S416). More specifically, the analyzing means 27 writes the created hierarchical structure data 36 into the storage device 30. As previously described, the hierarchical structure data 36 is stored in association with the target module 31. Accordingly, with reference to the similar line 364n, or the similarity notifier 364 related to the target range, in the hierarchical structure data 36, the target ranges similar to each other in the target module 31 can be easily found out.

Figure 7:
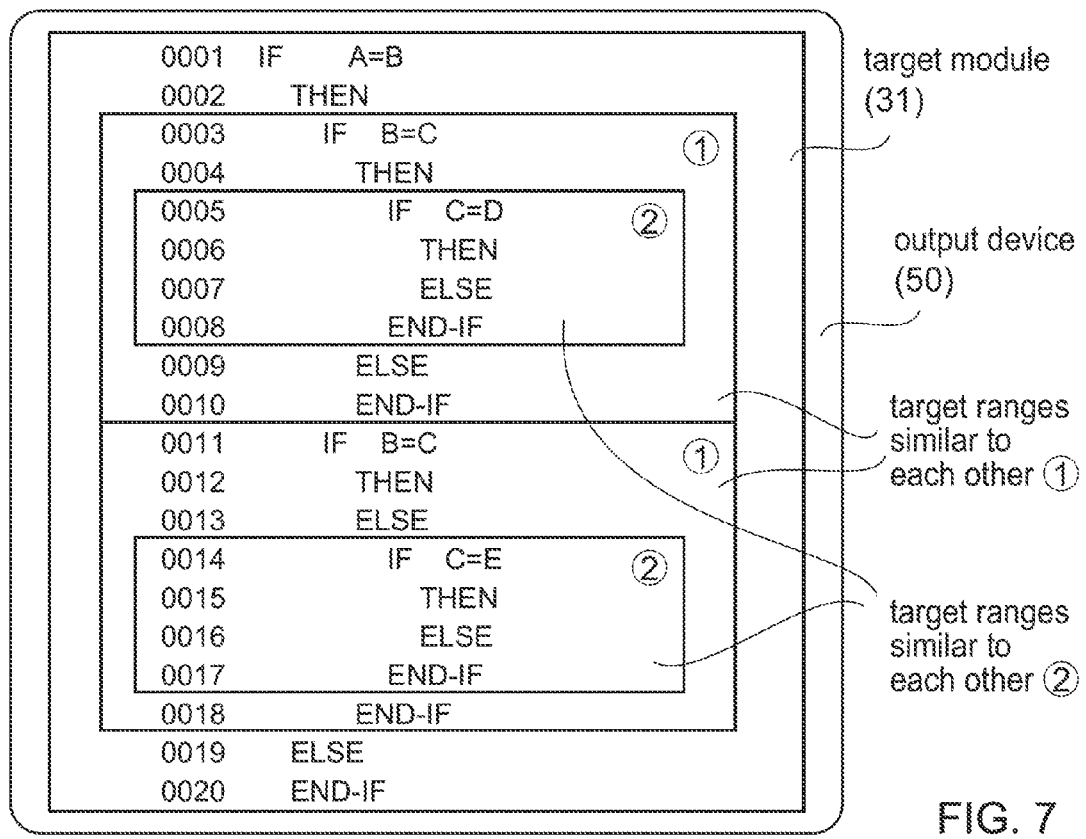
FIG. 7 is a diagram showing, with use of the example, display results of the analyzing means of FIG. 4.

Then, the analyzing means 27 outputs the target module 31 in such a manner that the similar parts can be identified (S420) and ends its process. More specifically, the analyzing means 27 outputs the target module 31, for example, as shown in FIG. 7. As shown in FIG. 7, each of the target ranges similar to each other in the target module 31 is enclosed by a frame to be output. Moreover, a similarity identifier (circled digit in FIG. 7) is output inside the frame, wherein the similarity identifier indicates its similar target range. However, the target range similar to the target range may be indicated, without outputting the similarity identifier, by changing properties (color, thickness and so on) of the frame. Moreover, when the target ranges similar to each other are apart from each other in the target module 31, for example, the target range nearest to the top of the target module 31 may be output. By outputting the target ranges similar to each other in such a manner that enables visual and easy understanding, it becomes possible to easily figure out parts which need to be maintained. Moreover, it is also possible to figure out parts which should be converted into a common processing section.

In the output process (S420), the analyzing means 27 may output not the target module 31 but the created hierarchical structure data 36. In other words, analyzing means 27 may output the target module 31 and the similarity notifier 364 to the output device 50 while associating them with each other.

Although the analyzing means 27 according to the present embodiment has the write function (S418) and the output function (S420), the analyzing means 27 may have one of the write function (S418) and the output function (S420). Moreover, any of the aforementioned two functions does not necessarily need to be included, and another function may be included instead, wherein the function sends the target module 31 and the similarity notifier 364 to the other device or means while associating them with each other.

Figure 8:
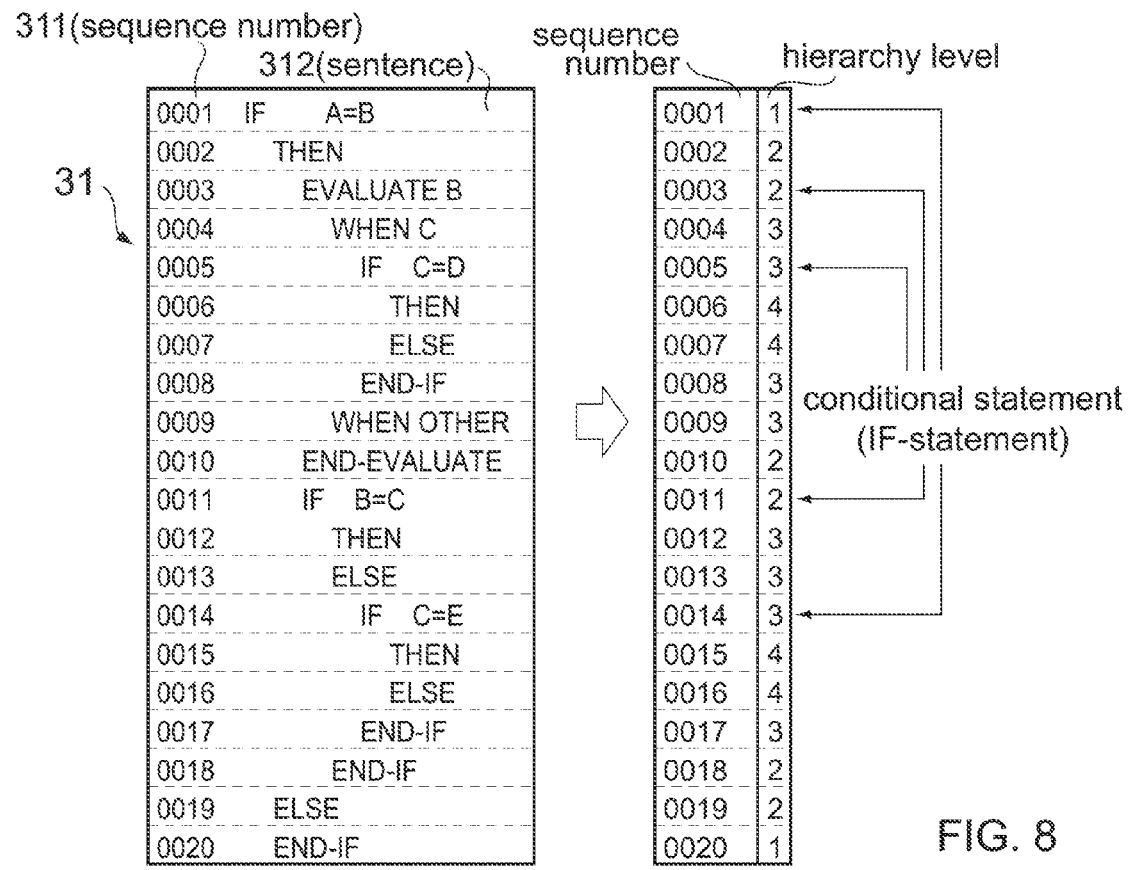
FIG. 8 is a diagram showing, with use of another example, the former part of the analyzing process of the analyzing means of FIG. 4.

As shown in FIG. 8, the target module 31 may include the conditional statement other than IF-statement. For example, for EVALUATE-statement, the analyzing means 27 may update the hierarchy level in each time when WHEN phrase is found while setting back the hierarchy level prior to the updating in each time when corresponding END-EVALUATE is found. The conditional statement other than IF-statement and EVALUATE-statement can be similarly processed. As can be seen easily, the function and the process of the analyzing means 27 after the hierarchy levels are applied are same as those in the case where the target module 31 includes only IF-statement as the conditional statement.

As described below, the analyzing means 27 according to the present embodiment can be modified variously.

For example, the analyzing means 27 may, instead of setting the similar line 364n of the second target range (i.e. the compared target range) to the sequence number 361 of the first target range (i.e. the comparing target range), set the similar line 364n of the first target range to the sequence number 361 of the second target range. Moreover, the similar lines 364n of the first target range and the second target range may be set to the sequence numbers 361 of the second target range and the first target range, respectively. In other words, the analyzing means 27 may create the similarity notifier 364 in association with the first target range and/or the second target range.

Moreover, under a case where the first target range (or the second target range) is similar to a plurality of the second target ranges (or the first target ranges), the analyzing means 27 may set the similar line 364n to the sequence number 361 of the second target range (or the first target range) that is first found to be similar. Alternatively, the analyzing means 27 may set the similar line 364n to the sequence numbers 361 of all of the second target ranges (or the first target ranges) that are found to be similar.

However, as can be seen from FIG. 7, when the number of the detected similar target ranges becomes larger, or when the accuracy for finding the target ranges is higher, it becomes difficult to output them in association with the target module 31. Moreover, in many cases, the target ranges similar to each other also include the target ranges similar to each other therewithin. In these cases, if all of the similar target ranges are stored in the hierarchical structure data 36, the number of the lines 360 each of which has the valid similar line 364n needlessly becomes larger so that it might increase man-hour for investigating and studying whether maintenance is necessary or not. On the other hand, if the target ranges for determining similarity are limited, the investigation and the study about the necessity of the maintenance might be missed. Accordingly, it is preferable that the accuracy for finding the similar target ranges is adjusted, for example, to meet the details of the maintenance.

For example, when efficiency in the maintenance subsequent to the detection of the similar parts is important, it is preferable that the analyzing means 27 does not use, in the analyzing function (S404 to S416 in FIG. 4), the target range (the line 360) that satisfies a predetermined condition as the first target range. As the predetermined condition, for example, it is possible to use a condition depending on the number of the hierarchy levels combined into the hierarchy pattern 362 of the line 360. More specifically, when the number of the hierarchy levels combined into the hierarchy pattern 362 is smaller than a predetermined number (for example, 10), this target range may be left without being used as the first target range. Alternatively, when the maximum number of the hierarchy levels in the target range is smaller than a predetermined number (for example, 4), this target range may be left without being used as the first target range.

A plurality of the modules 31 may be combined to be used as the target module 31. For example, the plurality of the modules 31 may be simply and sequentially combined from each start line to the end line to form the target module 31. By doing so, the similar target ranges in the whole system can be found at one time. Moreover, the plurality of the modules 31 can be combined like a second embodiment as described below.

Second Embodiment

Figure 9:
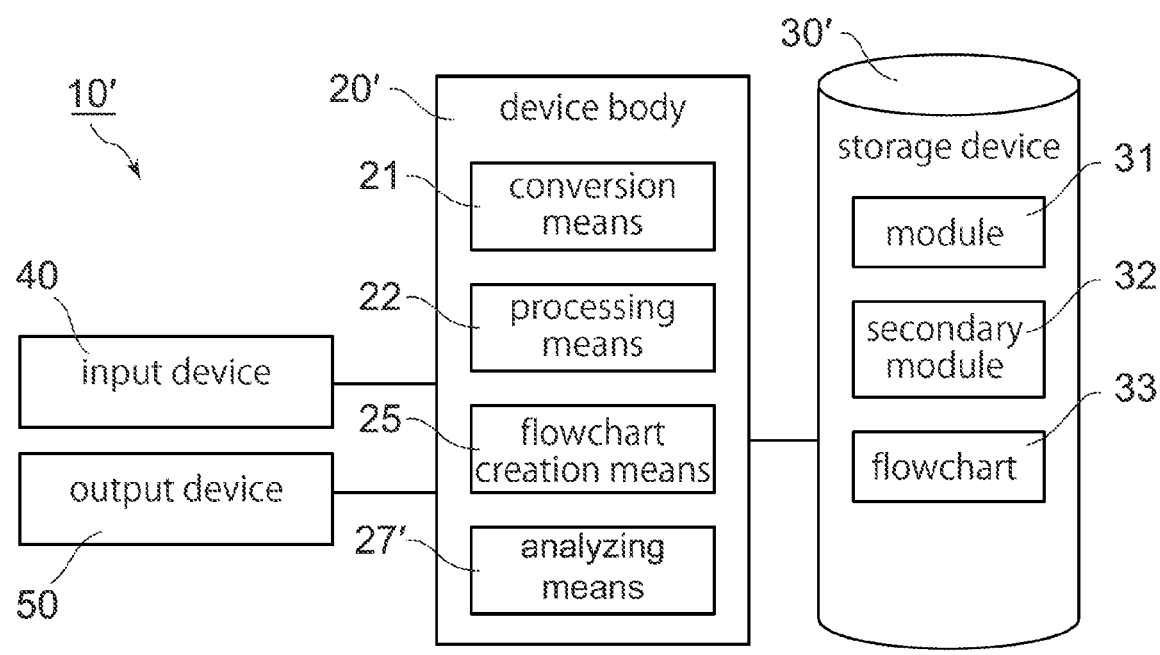
FIG. 9 is a block diagram showing a structure analysis device according to a second embodiment of the present invention.

As shown in FIG. 9, a structure analysis device 10' according to the second embodiment of the present invention comprises a device body 20', a storage device (storage means) 30', the input device 40 and the output device 50. Similar to the structure analysis device 10 according to the first embodiment, the structure analysis device 10' is to perform the structure analysis of the module (source program) including one or more sentences written in a program language. The program language, the module, the input device 40 and the output device 50 according to the second embodiment are configured similar to the first embodiment.

As shown in FIG. 9, the storage device 30' is a magnetic disk unit similar to the storage device 30. The storage device 30' stores one or more of the modules 31 similar to the first embodiment. Moreover, the storage device 30' stores secondary modules (modules) 32 and flowcharts 33. The secondary module 32 according to the present embodiment is created by combining and converting the modules 31. The flowchart 33 is created from the secondary module 32.

The device body 20' is, for example, a main body of PC similar to the device body 20. The device body 20' has CPU, the primary storage device and so on (not shown). Similar to the first embodiment, each of the storage device 30' and the primary storage device functions as a readable and writable storage means according to the present embodiment. In the following explanation, the storage device 30' is used as an example of the storage means.

The storage device 30' according to the present embodiment stores a conversion program, a processing program, a flowchart creation program and an analyzing program (not shown). The aforementioned programs are loaded into the primary storage device and executed by CPU so that the computer functions as a conversion means 21, a processing means 22, a flowchart creation means 25 and an analyzing means 27', respectively. Thus, the aforementioned programs are for making the computer function as the structure analysis device 10' that supports structure analysis of modules. In other words, the device body 20' of the structure analysis device 10' according to the present embodiment comprises the conversion means 21, the processing means 22, the flowchart creation means 25 and the analyzing means 27'.

The conversion means 21 according to the present embodiment is to convert a predetermined target module 31 among the modules 31 stored in the storage device 30' into a secondary module 32 to store the secondary module 32 into the storage device 30'. The processing means 22 is to process the secondary module 32 stored in the storage device 30'. The flowchart creation means 25 is to create a table-form flowchart 33 from the secondary module 32 stored in the storage device 30'. The analyzing means 27' is to perform structure analysis of the module 31 stored in the storage device 30' similar to the analyzing means 27 of the first embodiment. However, the analyzing means 27' according to the present embodiment does not directly analyze the module 31 but performs the structural analysis of a predetermined target module 32 among the secondary modules 32.

Figure 10:
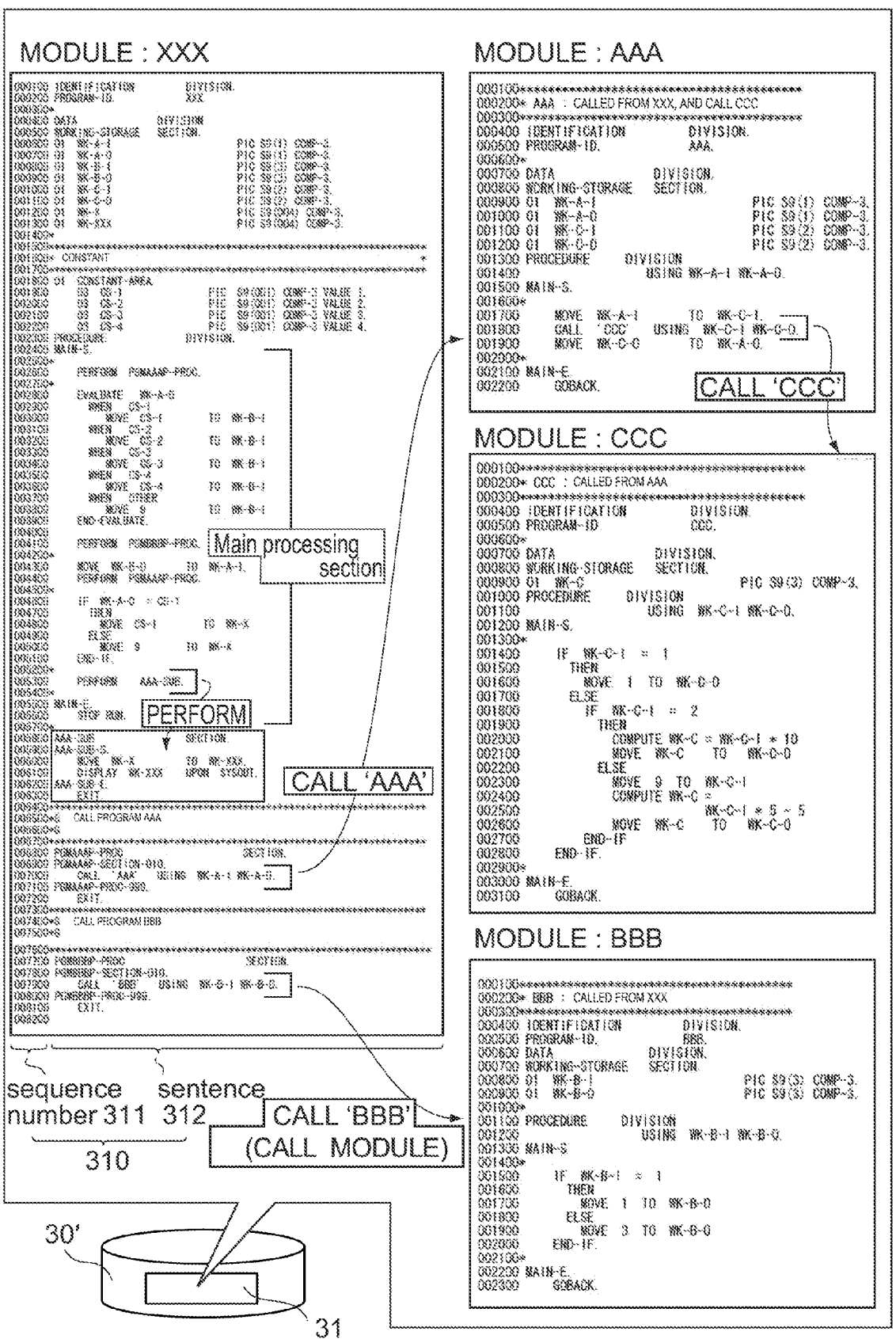
FIG. 10 is a diagram showing an example of modules stored in a storage device of FIG. 9.

As shown in FIG. 10, the storage device 30' stores, for example, a module 31 (XXX module) having a module name of XXX, another module 31 (AAA module) having another module name of AAA, another module 31 (BBB Module) having another module name of BBB and another module 31 (CCC module) having another module name of CCC. Each of the modules 31 is composed of a plurality of the lines 310 each of which is formed of the sequence number 311 and the sentence 312. Hereafter, more specific explanation about the structure of the module 31 is made in reference to these examples.

XXX module is a main module, or a module where process starts. XXX module has the lines 310 where the respective CALL-statements for identifying and calling AAA module and BBB module by using the module names are described. AAA module has the line 310 where CALL-statement which calls CCC module is described.

Each of the example modules 31 illustrated in FIG. 10 includes one or more of the sections. For example, XXX module has a main section, or a main processing section where process of the module starts, and sub-sections, or subordinate processing sections. The main section is composed of the lines 310 between the line 310 next to the line 310 where "PROCEDURE DIVISION." is described and the line 310 where "STOP RUN." is described. One subordinate section (sub-section) is composed of the lines 310 between the line 310 where "AAA-SUB SECTION." is described and the line 310 where "EXIT." is described. The aforementioned sub-section has the section name (processing section name) of AAA-SUB. The main section includes the line 310 which identifies and performs AAA-SUB section by using its section name. More specifically, the main section includes the line 310 where "PERFORM AAA-SUB." is described.

Some of the example sections illustrated in FIG. 10 include the lines 310 where the conditional statements are described. For example, the main section of XXX module includes the lines 310 where EVALUATE-statement having five WHEN phrases is described and the lines 310 where IF-statement having THEN and ELSE is described. The main section of CCC module includes the lines 310 where IF-statement is subordinately described in ELSE of IF-statement so that the conditional statements form hierarchies of the sentences 312.

Figure 11:
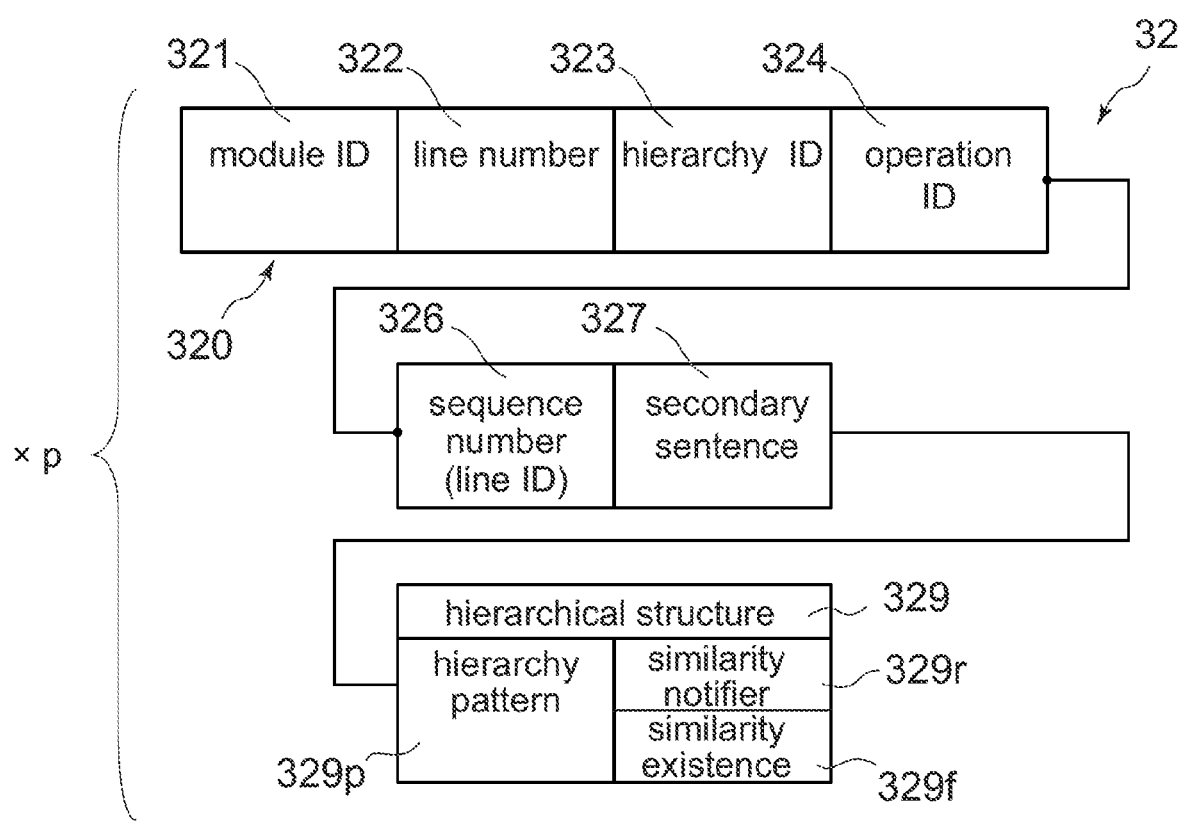
FIG. 11 is a diagram schematically showing a structure of a file of a secondary module stored in the storage device of FIG. 9.

As shown in FIG. 11, the secondary module 32 according to the present embodiment is composed of p (p≥1) secondary lines (lines) 320. The secondary module 32 according to the present embodiment is a worksheet of MICROSOFT EXCEL (registered trademark in Japan). However, the secondary module 32 may be a text file, for example. The line 320 according to the present embodiment is composed of at least a module ID 321, a line number 322, a hierarchy ID 323, an operation ID 324, a sequence number (line ID) 326, a secondary sentence 327 and a hierarchical structure 329. The hierarchical structure 329 includes a hierarchy pattern 329p and a similarity notifier 329r. The similarity notifier 329r according to the present embodiment includes a similarity existence 329f.

The secondary module 32 is generated by collecting and processing the lines 310, where the executable statements and so on are described, from one or more of the modules 31. The secondary module 32 according to the present embodiment is generated by the conversion means 21 and processed by the processing means 22 and the analyzing means 27'. In particular, the hierarchical structure 329 of the secondary module 32 is set by the analyzing means 27' similar to the hierarchical structure data 36 in the first embodiment.

As shown in FIG. 12, an example of the secondary module 32 according to the present embodiment is generated by collecting and processing the lines 310 in PROCEDURE DIVISION of XXX module, AAA module, BBB module and CCC module.

As can be seen from FIGS. 10 and 12, in the secondary sentence 327 of the line 320, CALL-statement described in the sentence 312 of the line 310 is commented out, or changed into a comment statement. The sentences 312 in PROCEDURE DIVISION of AAA module, which is to be called by CALL-statement, are expanded to be the secondary sentences 327 of the lines 320, or expanded so that the secondary sentences 327 of the lines 320 are generated. Moreover, the sentences 312 in PROCEDURE DIVISION of CCC module, which is to be called by CALL-statement of AAA module, are expanded to be the secondary sentences 327 of lines 320. Similarly, PERFORM-statement described in the sentence 312 of the line 310 is commented out in the secondary sentence 327 of the line 320. Moreover, the sentences 312 in AAA-SUB SECTION, which is to be performed by PERFORM-statement, are expanded to be the secondary sentences 327 of the lines 320.

The conditional statements (EVALUATE-statement according to the present embodiment) other than IF-statement among the conditional statements described in the sentences 312 are converted into IF-statements in the secondary sentences 327. For example, the three sentences 312 where "EVALUATE WK-A-O", "WHEN CS-1" and "MOVE CS-1 TO WK-B-I" are described, respectively, are converted into the five secondary sentences 327 where "* # E EVALUATE WK-A-O" (comment statement), "* # E WHEN CS-1" (comment statement), "IF (WK-A-O=CS-1)", "THEN" and "MOVE CS-1 TO WK-B-I" are described, respectively. According to the present embodiment, in addition to the above conversion, the secondary sentences 327 to cover omission of THEN, ELSE and END-IF in IF-statement are generated. Moreover, a negative conditional expression is converted into an affirmative conditional expression. Moreover, IF-statement having the conditional expressions coupled with each other by AND or OR is broken down into a plurality of IF-statements, or converted into IF-statements each having a simple secondary conditional expression which evaluates the relation of the two operands only by a single logical operator. However, some of the aforementioned conversions (for example, the breakdown of the conditional expressions coupled with each other by AND or OR) does not necessarily need to be done.

In addition to the above, MOVE-statement and so on each of which is separately described in a plurality of the sentences 312 is joined into the single secondary sentence 327. Thus, each of the lines 320 of the secondary module 32 is generated based on the line 310 of the module 31. More specifically, the secondary sentence 327 is either just a copy of the sentence 312 or an expansion generated by processing and/or expanding the sentence 312.

The module ID 321 according to the present embodiment is to indicate the module 31 on which the line 320 is based. More specifically, the module ID 321 is set to the module name, for example, XXX. However, the number and so on which can uniquely identify the module 31 may be stored instead of the module name.

The sequence number 326, in the line 320 having the secondary sentence 327 that is the copy of the sentence 312, is set to the sequence number 311 of the copied source line 310. In the line 320 having one-to-one correspondence with the line 310, for example, in the line 320 of the secondary sentence 327 generated by commenting out the sentence 312, the sequence number 326 is set to the sequence number 311 of the corresponding line 310. On the other hand, the sequence number 326 in the generated (added) line 320 is set to an identifier, for example, a combination of symbols, which can indicate that the line 320 is generated. By doing so, the line 320 and the line 310 can be easily associated with each other when the system is maintained.

The line number 322 according to the present embodiment is set to a serial number which starts from 1 and is incremented along the order of the lines 320. However, the line number 322 does not need to be the serial number, provide that the line numbers 322 can be compared with one another in magnitude relation. For example, the line number 322 may be a combination of characters and symbols.

The hierarchy ID 323 according to the present embodiment is composed of a branch hierarchy and a hierarchy depth. The branch hierarchy is used to specify a hierarchy formed with the conditional statements. The branch hierarchy according to the present embodiment is set in such a manner that uses 1 as the starting value at the first line 320. In other words, the branch hierarchy of the first line 320 is 1. The branch hierarchy is changed into 1.1 at the line 320 where THEN of IF-statement is described while being changed into 1.2 at the line 320 where ELSE is described. The branch hierarchy returns to 1 from the line next to the line 320 where END-IF of IF-statement is described. When generalized: at the line 320 where THEN is described, "0.1" is appended to the end of the branch hierarchy of the immediately preceding line 320; at the line 320 where ELSE is described, "0.1" of the end of the branch hierarchy of the immediately preceding line 320 is changed into "0.2"; and at the line 320 next to the line 320 where END-IF is described, "0.2" of the end of the branch hierarchy of the line 320 where END-IF is described is removed. Except the above cases, the branch hierarchy is set to a value same as that of the immediately preceding line 320.

Similar to the branch hierarchy, the hierarchy depth according to the present embodiment is set in such a manner that uses 1 as the starting value at the first line 320. In other words, the hierarchy depth of the first line 320 is 1. The hierarchy depth is changed into 1.1 at the line 320 where THEN of IF-statement is described while returns to 1 from the line 320 next to the line 320 where END-IF of IF-statement is described. Thereafter, the hierarchy depth is changed into 1.2 at the line 320 where THEN of IF-statement is described while returns to 1 from the line 320 next to the line 320 where END-IF of IF-statement is described. When generalized: the hierarchy depth has the starting value of 1; at the line 320 where THEN is described, a digit of ".q" (q is an integer equal to or more than 1) is appended to its end; and at the line 320 next to the line 320 where END-IF is described, its end digit of ".q" is removed. The value of q in ".q" starts from 1 for each digit. In detail, the value of q in ".q" of the first digit (for example, "0.2" of 1.2) starts from 1 and is incremented in each time to be appended. The value of q in ".q" of the second digit or the digit after the second digit (for example, "0.1" of 1.2.1) starts from 1 in a continuous range and is incremented in each time to be appended in this continuous range, wherein the continuous range is composed of successive lines 320 having the same hierarchy depth as one another except this digit.

The operation ID 324 indicates the type of the statement which is described in the secondary sentence 327. The operation ID 324 according to the present embodiment is formed of an operation name, an indicator indicating whether it is a conditional operation or not (conditional-operation-or-not: simply described as "CONDITIONAL OPERATION" in FIG. 12) and an indicator indicating whether it is a processing operation or not (processing-operation-or-not: simply described as "PROCESSING OPERATION" in FIG. 12). When a part of elements of IF-statement is described, or when IF, THEN, ELSE or END-IF is described, in the secondary sentence 327, the conditional-operation-or-not is set to O. When the executable statement other than IF-statement is described, for example, when MOVE-statement or COMPUTE-statement is described, in the secondary sentence 327, the processing-operation-or-not is set to O. When one of the conditional-operation-or-not and the processing-operation-or-not is set to O, the operation name is set to an operation name described in the secondary sentence 327, namely, IF, THEN, END-IF, MOVE and so on.

The hierarchy pattern 329p is to specify the hierarchical structure of the target range similar to the first embodiment. In detail, similar to the first embodiment, the hierarchy pattern 329p in the line 320 where IF-statement starts (i.e. where the target range starts) is set to the hierarchy pattern of combined hierarchy levels. As can be seen from the part shown by dashed line A in FIG. 12, according to the present embodiment, length of the hierarchy ID (for example, digit number of the hierarchy depth) indicates the hierarchy level.

The similarity notifier 329r is set to data which notifies existence of the target ranges similar to each other in the secondary module 32 similar to the first embodiment. According to the present embodiment, the similarity existence 329f is set to a flag which indicates existence or nonexistence of the line 320 having the hierarchy pattern 329p same as the hierarchy pattern 329p in this line 320.

The line 320 may include various items in addition to the items described above. For example, when the line 320 includes the section name of the corresponding line 310, correspondence between the line 320 and the line 310 can be understood more easily.

According to the present embodiment, various files can be created based on the secondary module 32 stored in the storage device 30'. Each of the created files can be displayed on or printed from the output device 50 as a document which supports syntax analysis of the module 31. More specifically, the flowchart 33 can be created based on the secondary module 32, for example.

As can be seen from FIG. 13, the flowchart 33 according to the present embodiment is a worksheet of MICROSOFT EXCEL (registered trademark in Japan). However, the flowchart 33 may be a file and so on having another format. According to the present embodiment, the flowchart 33 is created from the secondary module 32.

The flowchart 33 is created by arranging the secondary sentences 327 of the secondary module 32 in a flowchart-like manner. More specifically, the secondary sentences 327 that are not related to any IF-statement are sequentially arranged in the 2nd column (the column having a header where "2" is illustrated) along arrangement order of the lines 320 in the secondary module 32. On the other hand, the secondary sentences 327 that are related to some IF-statement (i.e. the secondary sentences 327 each including the statement described between IF and END-IF) are arranged so that the secondary sentence 327 that is to be executed when the conditional expression of IF-statement is satisfied, and the secondary sentence 327 that is to be executed when the conditional expression of IF-statement is not satisfied are separated from each other to be arranged at left and right sides.

The 1st column of the flowchart 33 include the line numbers 322 of the secondary sentences 327 arranged in the 2nd column so that the rows of the flowchart 33 can be associated with the lines 320 of the secondary module 32, respectively. The flowchart 33 can include not only the line number 322 but also any item in the line 320.

As can be seen from the above description, the number of the columns of the flowchart 33 according to the present embodiment is increased as the hierarchies formed with IF-statements become deeper. In other words, a part of the secondary module 32, where the rather complicated conditional statements are described, is output to be extended in a column direction of the table. Accordingly, when the flowchart 33 is displayed on the output device 50, the difference between processes corresponding to the true case and the false case of the conditional expression can be understood by comparing the executable statements which are arranged and displayed in the left and right columns. Any process block in the flowchart 33 can be colored to be displayed on the output device 50. For example, it is possible to set a predetermined background color A for the cells each containing IF or END-IF in the flowchart 33, to set a predetermined background color B for the secondary sentences 327 to be executed in THEN-process and to set a predetermined background color C for the secondary sentences 327 to be executed in ELSE-process. By doing so, when the flowchart 33 is displayed on the output device 50, the hierarchical structure formed with IF-statements can be visually figured out as a pattern of the combined background colors.

Hereafter, explanation is made in detail about the function and the process of the structure analysis device 10' according to the present embodiment.

Figure 14:
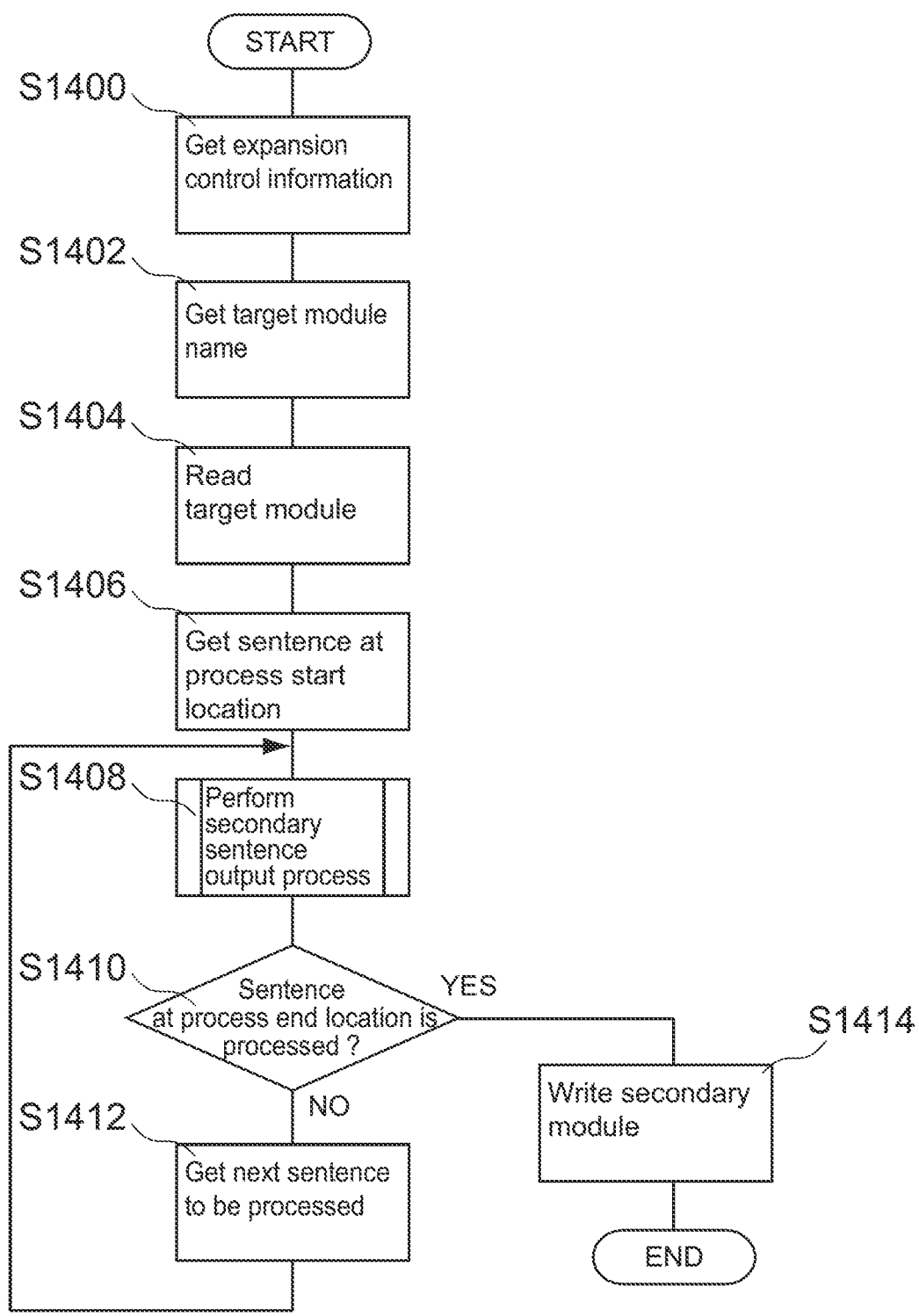
FIG. 14 is a flowchart showing functions of a conversion means of the structure analysis device of FIG. 9.

As can be seen from FIG. 14, the conversion means 21 according to the present embodiment has a control information getting function (S1400), a read function (S1402 and S1404), a conversion function (S1406 to S1412) and a write function (S1414). The control information getting function is a function to get an expansion control information. The read function is a function to read a target module 31 to be processed among the modules 31 from the storage device 30'. The conversion function is a function to convert the target module 31 into the secondary module 32. The write function is a function to store the secondary module 32 into the storage device 30'.

More specifically, as shown in FIG. 14, when the conversion means 21 is activated, for example, by a start instruction input from the input device 40, the conversion means 21 gets the expansion control information, for example, which is input as a part of the start instruction (S1400). The expansion control information according to the present embodiment can optionally include an expansion limit indicator. The expansion limit indicator indicates that an expansion of the statements described in the sentences 312 of each of the processing section to be performed and the module 31 to be called is limited only once at first time.

Then, the conversion means 21 gets a target module name which identifies the target module 31 (S1402). The target module name can be obtained similar to the expansion control information. The conversion means 21 reads the target module 31 that is identified by the obtained target module name from the storage device 30' (S1404). At that time, for example, the aforementioned target to be read may be limited to the module 31 stored in a predetermined folder. If the target module 31 is not stored in the storage device 30', the conversion means 21 ends its process (not shown).

Then, the conversion means 21 gets the sentence 312 at a process start location of the target module 31 (S1406). The process start location according to the present embodiment is the top of the main section. The conversion means 21 performs a secondary sentence output process for the obtained sentence 312 (S1408). Then, the conversion means 21 determines whether the sentence 312 at a process end location is already processed (S1410). The process end location according to the present embodiment is the end of the main section. If already processed (YES at S1410), the conversion means 21 writes the generated secondary module 32 into the storage device 30' (S1414) and ends its process. On the other hand, if not yet processed (NO at S1410), the conversion means 21 gets the sentence 312 to be processed next, or the sentence 312 of the next line 310 (S1412) and performs the secondary sentence output process for the obtained sentence 312 (S1408).

Figure 15:
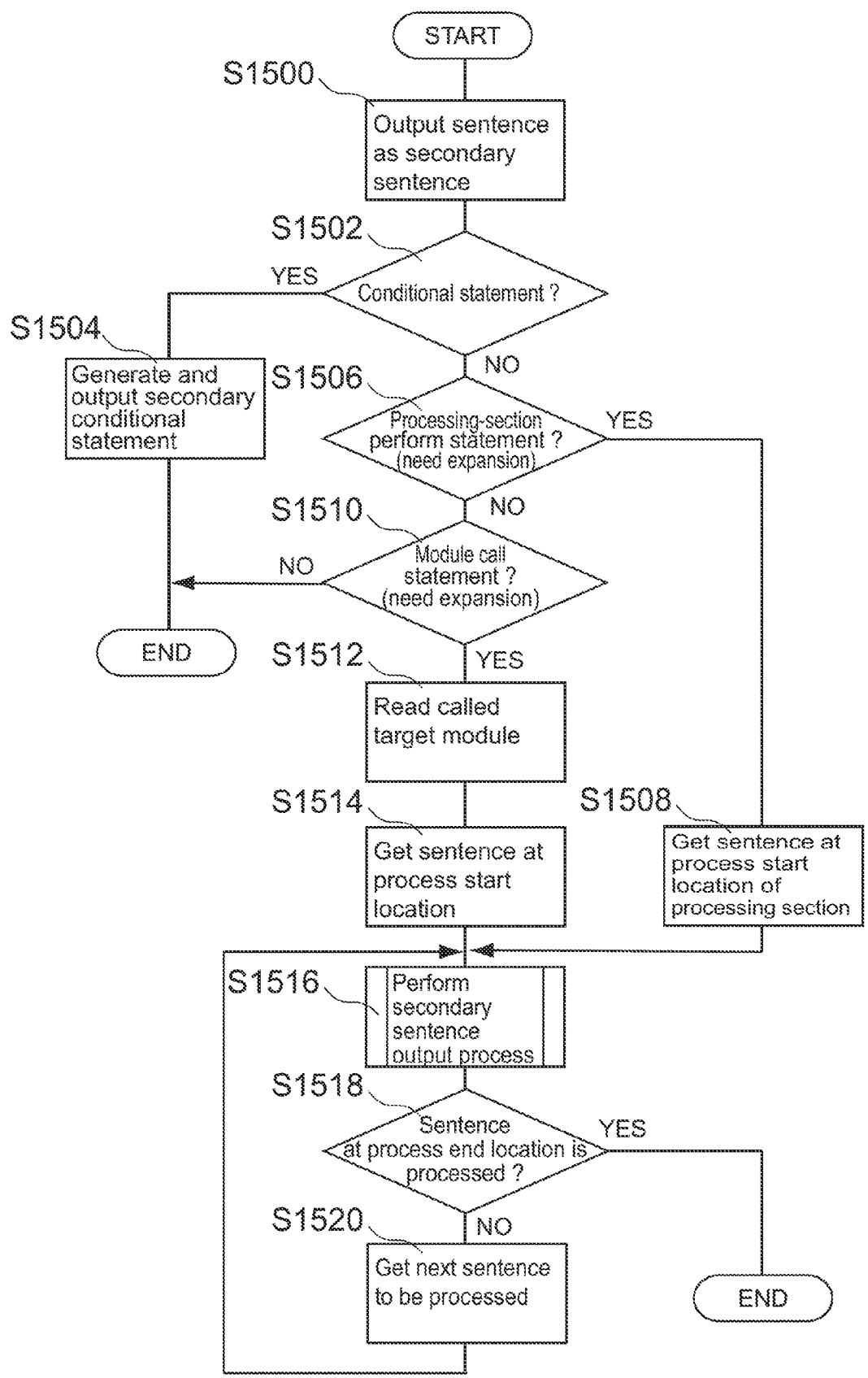
FIG. 15 is a flowchart showing, in further detail, a part of the function of the conversion means of FIG. 14.

FIG. 15 is a flowchart showing in more detail the secondary sentence output process (S1408) among the processes (functions) of the conversion means 21 shown in FIG. 14. As shown in FIG. 15, the conversion means 21 outputs the sentence 312 as the secondary sentence 327 in the secondary sentence output process (S1500). More specifically, according to the present embodiment, the executable statement and so on described in the sentence 312 are copied to a predetermined row and column of a worksheet. Meanwhile, as previously described, the processing such as the commenting out of PERFORM-statement is done. In addition, the conversion means 21 sets the module ID 321, the line number 322 and the sequence number 326 to the previously described values.

Then, the conversion means 21 determines whether the conditional statement is described in the sentence 312 (S1502). If the executable statement described in the sentence 312 is the conditional statement (YES at S1502), as previously described, the conversion means 21 performs the process that converts the conditional statement other than IF-statement into IF-statement. More specifically, the conversion means 21 generates the secondary sentences 327 including the secondary conditional statement (IF-statement), which is a kind of a secondary statement, based on the conditional expression of the conditional statement, hierarchizes the secondary sentences 327 by using the secondary conditional statement to output them into the secondary module (S1504), and ends its secondary sentence output process. The aforementioned secondary conditional statement is the conditional statement (secondary sentence 327) that selects the secondary sentence 327 to be executed by determining whether the secondary conditional expression is satisfied or not, wherein the secondary conditional expression evaluates the relation between the two operands to be evaluated by the only one logical operator.

If the executable statement described in the sentence 312 (determination target statement) is not the conditional statement (NO at S1502), the conversion means 21 determines whether the determination target sentence is the processing-section perform statement (PERFORM-statement) or not (S1506). If the determination target sentence is the processing-section perform statement (YES at S1506), the conversion means 21 gets the sentence 312 at a process start location of the processing section to be performed (according to the present embodiment, section). In the present embodiment, the process start location of the processing section is the top of the section.

If the determination target sentence is not the processing-section perform statement (NO at S1506), the conversion means 21 determines whether the determination target sentence is the module call statement (according to the present embodiment, CALL-statement) or not (S1510). If the determination target sentence is the module call statement (YES at S1510), the conversion means 21 reads the called target module 31 that is identified by CALL-statement from the storage device 30' (S1512) and gets the sentence 312 at a process start location of the called target module 31 (S1514). According to the present embodiment, the process start location of the called target module 31 is the top of the main section of this module 31. If the determination target sentence is not the module call statement (NO at S1510), the conversion means 21 ends its secondary sentence output process.

The conversion means 21 recursively performs the secondary sentence output process for the sentence 312 of the section to be performed or for the sentence 312 of the called target module 31 (S1516). Then, the conversion means 21 determines whether the sentence 312 at a process end location is already processed (S1518). The process end location according to the present embodiment is either the end of the section to be performed or the end of the main section of the called target module 31. If already processed (YES at S1518), the conversion means 21 ends its secondary sentence output process. On the other hand, if not yet processed (NO at S1518), the conversion means 21 gets the next sentence 312 to be processed, or the sentence 312 of the next line 310 (S1520) and recursively performs the secondary sentence output process for the obtained sentence 312 (S1516).

The conversion means 21 does not perform the expansion of the sentences 312 of the section to be performed for recursive PERFORM-statement (which performs itself). Similarly, the conversion means 21 does not perform the expansion of the sentences 312 of the called target module for recursive CALL-statement (which calls itself). Moreover, when the expansion limit indicator is included in the expansion control information, the conversion means 21 does not perform the secondary sentence output process for PERFORM-statement that performs the section having the section name same as that of the section for which the secondary sentence output process is already done (S1506). Similarly, when the expansion limit indicator is included in the expansion control information, the conversion means 21 does not perform the secondary sentence output process for CALL-statement that calls the module 31 having the module name same as that of the module 31 for which the secondary sentence output process is already done (S1510).

As can be seen from the above explanation, the conversion function of the conversion means 21 sequentially outputs each of the sentences 312 described between the predetermined process start location and the predetermined process end location of the target module 31 into the secondary module as the secondary sentence 327. Moreover, when the sentence 312 is the processing-section perform statement or the module call statement, the conversion function of the conversion means 21 generates the secondary sentences 327 to output them into the secondary module 32, wherein the secondary sentences 327 are generated from the sentences 312 which are described in the processing section to be performed or in the called target module 31. Moreover, the conversion function of the conversion means 21 further expands (i.e. recursively expands) the processing-section perform statement and the module call statement in the expansion of the sentences 312. Accordingly, the function distributed in the many processing sections and the modules 31 can be collected in such a manner that the distributed function is hauled into the main section of the target module 31. As previously described, according to the present embodiment, the predetermined process start location and the predetermined process end location of the module 31 are the top and the end of the main section, respectively. However, the predetermined process start location and the predetermined process end location of the module 31 may be the top and the end of PROCRDURE DIVISON, respectively. For example, at least one of the predetermined process start location and the predetermined process end location can be located at the middle of the main section. However, the present embodiment is preferable in order to obtain a sufficient expansion while avoiding unnecessary expansion.

As can be seen from the above explanation, when the expansion limit indicator is included in the expansion control information, the conversion function of the conversion means 21 according to the present embodiment generates the expansion of the sentences 312 described in the processing section to be performed only once at first time (i.e. expands the same processing section only once) for the same processing section, and generates the expansion of the sentences 312 described in the called target module 31 only once at first time (i.e. expands the same module 31 only once) for the same module. However, the conversion function of the conversion means 21 may expand the same processing section or the same module 31 only once regardless of whether the expansion limit indicator is included or not. Alternatively, the conversion function of the conversion means 21 may repeatedly expand the same processing section or the same module 31 regardless of whether the expansion limit indicator is included or not.

As described above, the secondary module 32 composed of the secondary sentences 327 is stored into the storage device 30' by the conversion means 21.

Figure 16:
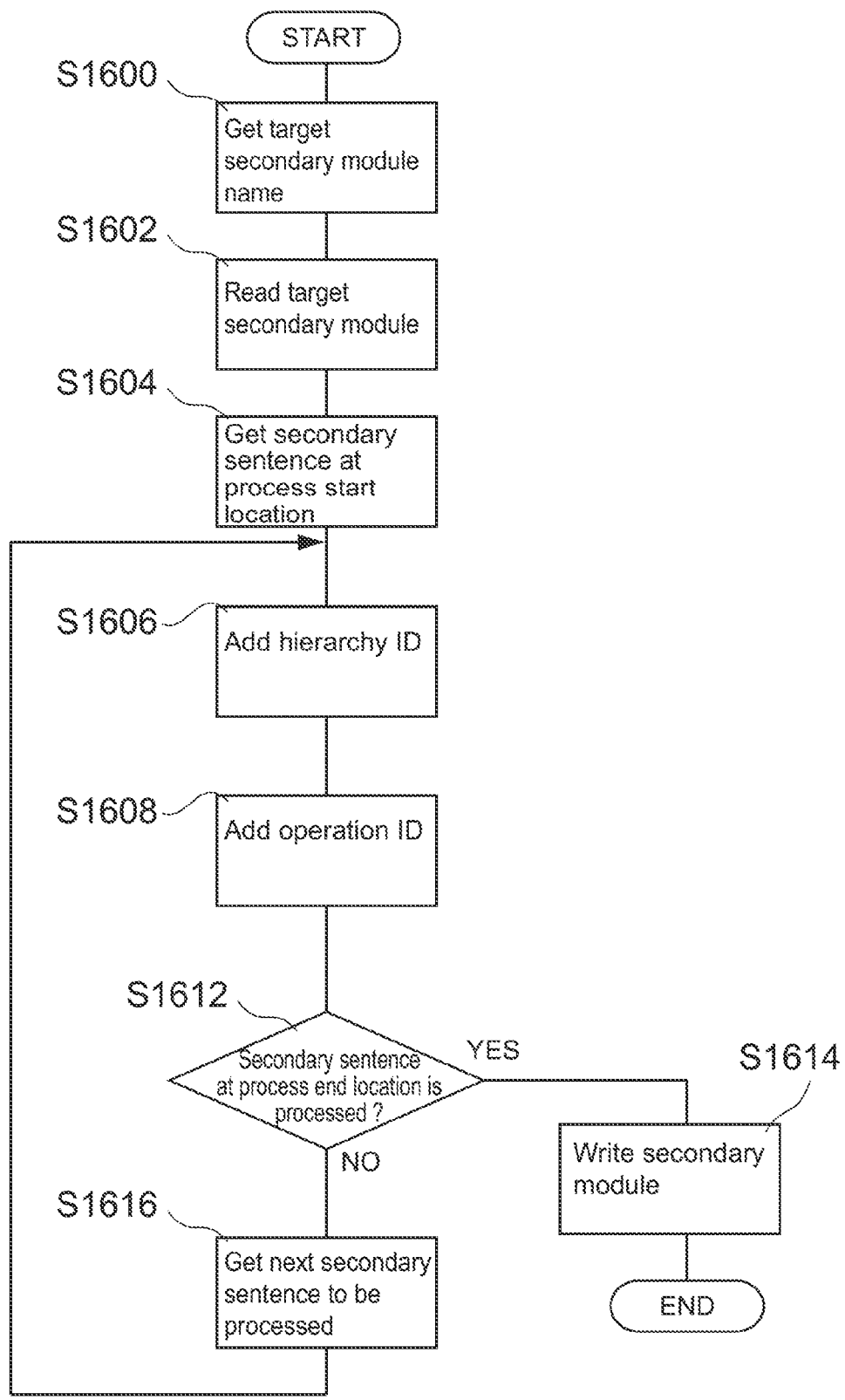
FIG. 16 is a flowchart showing functions of a processing means of the structure analysis device of FIG. 9.

As can be seen from FIG. 16, the processing means 22 according to the present embodiment has a read function (S1600 and S1602), a hierarchy ID adding function (S1606) and an operation ID adding function (S1608), and a write function (S1614). The read function is a function to read a target secondary module 32 from the storage device 30'. The hierarchy ID adding function is a function to add the hierarchy ID 323 for at least one of the secondary sentences 327 of the secondary module 32. The hierarchy ID 323 according to the present embodiment indicates the hierarchy where the secondary sentence 327 belongs. The operation ID adding function is a function to add the operation ID 324 for at least one of the secondary sentences 327 of the secondary module 32. The operation ID 324 according to the present embodiment indicates the type of the statement which is described in the secondary sentence 327. The write function is a function to store the secondary module 32 into the storage device 30', wherein the secondary module 32 includes the secondary sentences 327 for which the hierarchy ID 323 and the operation ID 324 are added.

More specifically, as shown in FIG. 16, when the processing means 22 is activated, for example, similar to the conversion means 21, the processing means 22 gets a secondary module name which identifies a target secondary module 32 (S1600). The processing means 22 reads the secondary module 32 that is identified by the obtained target secondary module name from the storage device 30' (S1602). If the target secondary module 32 is not stored in the storage device 30', the processing means 22 ends its process (not shown).

Then, the processing means 22 gets the secondary sentence 327 at a process start location of the target secondary module 32 (S1604). The process start location according to the present embodiment is the top of the secondary module 32.

The processing means 22 adds the hierarchy ID 323 for the obtained secondary sentence 327 (S1606). More specifically, the processing means 22 according to the present embodiment outputs each of the branch hierarchy and the hierarchy depth, which are previously described, into the row and column that corresponds to the hierarchy ID 323 of the line 320 in the worksheet (i.e. target worksheet) where the target secondary module 32 is recorded. Then, the processing means 22 adds the operation ID 324 for the obtained secondary sentence 327 (S1608). More specifically, the processing means 22 according to the present embodiment outputs each of the operation name, the conditional-operation-or-not and the processing-operation-or-not, which are previously described, into the row and column that corresponds to the operation ID 324 of the line 320 in the target worksheet.

Then, the processing means 22 determines whether the secondary sentence 327 at a process end location is already processed (S1612). The process end location according to the present embodiment is the end of the secondary module 32. If already processed (YES at S1612), the processing means 22 writes the processed secondary module 32 into the storage device 30' (S1614) and ends its process. On the other hand, if not yet processed (NO at S1612), the processing means 22 gets the secondary sentence 327 to be processed next, or the secondary sentence 327 of the next line 320 (S1616) and adds the hierarchy ID 323 and so on for the obtained secondary sentence 327 (S1606 and S1608).

As described above, the processing means 22 stores the secondary module 32 including the secondary sentences 327 for which the hierarchy ID 323 and the operation ID 324 are add (according to the present embodiment, the worksheet where the hierarchy ID 323 and so on are added) into the storage device 30'.

The analyzing means 27' according to the present embodiment has functions similar to those of the analyzing means 27 according to the first embodiment. Hereafter, explanation is made by using FIG. 4 while referring to an example shown in FIG. 17.

When the analyzing means 27' is activated similar to the analyzing means 27, the analyzing means 27' reads a target module 32 from the storage device 30' or the primary storage device (S402 and S402). In other words, the target of the analysis by the analyzing means 27' is not the module 31 but the secondary module 32.

When the analyzing means 27' specifies a hierarchy level of each statement of the target module 32 (S404), the analyzing means 27' determines the start and the end of IF-statement by referring the operation name of the operation ID 324. Moreover, the analyzing means 27' uses the length of the hierarchy ID 323 as the hierarchy level. Referring to the example in FIG. 17, the hierarchy level is applied for each line 320 as shown in the second column from the right side.

The analyzing means 27' extracts a target range, or a range which is to be a target for analyzing its hierarchical structure, similar to the analyzing means 27 (S406). However, the analyzing means 27' according to the present embodiment does not use, as the target range, a range included in the target range. Specifically, referring to the example of the target module 32 shown in FIG. 17, two of IF-statements (conditional statements) start from the lines 320 having the line numbers 322 of 874 and 2397, respectively. Moreover, the aforementioned IF-statements end at the lines 320 having the line numbers 322 of 921 and 2437, respectively. The analyzing means 27' uses a range from the line 320 having the line number 322 of 874 to the line 320 having the line number 322 of 921 and another range from the line 320 having the line number 2397 of 874 to the line 320 having the line number 322 of 2437 as the target ranges. However, the analyzing means 27' does not use, for example, a range from the line 320 having the line number 322 of 882 to the line 320 having the line number 322 of 920 as the target ranges.

The analyzing means 27' creates a hierarchy pattern similar to the analyzing means 27 (S406). Referring to the example of the target module 32 shown in FIG. 17, for each of the line 320 having the line number 322 of 874 and the line 320 having the line number 322 of 2397, the hierarchy pattern of "1 2 3 4 3 4 5 4 3 2 1" is created to be output to the hierarchy pattern 329p.

Similar to the analyzing means 27, the analyzing means 27' selects two of the target ranges different from each other, namely, a first target range and a second target range, among the target ranges of the created hierarchical structures 329 (i.e. the target ranges of the target module 32). The analyzing means 27' creates the similarity notifier 329r when the hierarchical structure of the first target range is same as the hierarchical structure of the second target range (S410 to S416). The analyzing means 27' creates the similarity notifier 329r in association with the first target range and the second target range. More specifically, the analyzing means 27' determines, for each of the lines 320 of the target module 32, whether the same hierarchy pattern 329p exists or not (S410 to S416). When the analyzing means 27' finds the two lines 320 having the hierarchy patterns 329p same as each other, the analyzing means 27' sets the similarity notifier 329r of each of the found two lines 320 to a flag that indicates "similar one exists".

Referring to the example of the target module 32 shown in FIG. 17, the first target range (R1) and the second target range (R2) have the same hierarchy pattern 329p, wherein the first target range (R1) is a range from the line 320 having the line number 322 of 874 to the line 320 having the line number 322 of 921, and the second target range (R2) is another range from the line 320 having the line number 322 of 2397 to the line 320 having the line number 322 of 2437. Accordingly, the similarity notifier 329r of each of the line 320 having the line number 322 of 874 and the line 320 having the line number 322 of 2397 is set to "1" (similar target range exists).

Then, the analyzing means 27' determines whether every hierarchy pattern 329p is processed or not (S414) and performs the process of S418 if the process is completed (YES at S414). More specifically, the secondary module 32, for which the hierarchical structure 329 is set, is written (updated) into the storage device 30'. On the other hand, if an unprocessed hierarchy pattern 329p exists (NO at S414), the hierarchy pattern 329p to be processed next is obtained.

As can be seen from the above explanation, the analyzing means 27' according to the present embodiment, similar to the analyzing means 27 according to the first embodiment, can compare the similarity between the two target ranges. Moreover, according to the present embodiment, in the target module 32, a plurality of the related modules 31 are combined in the processing order. Accordingly, the similar target ranges in the whole system can be found at a time in a style which allows more easy investigation.

Figure 18:
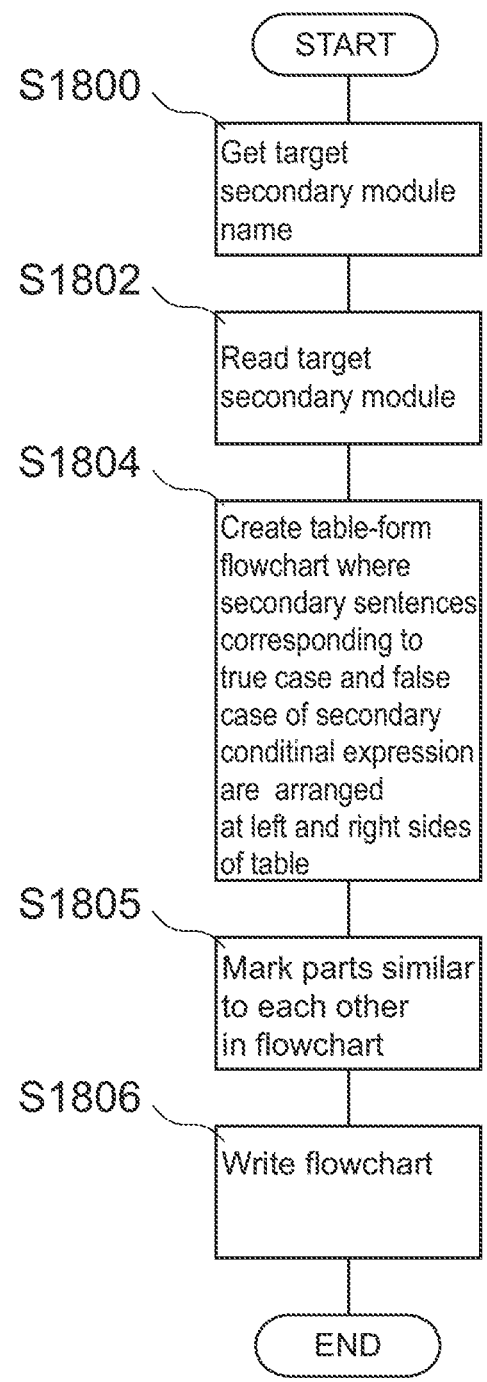
FIG. 18 is a flowchart showing functions of a flowchart creation means of the structure analysis device of FIG. 9.

As can be seen from FIG. 18, the flowchart creation means 25 according to the present embodiment has a read function (S1800 and S1802), a flowchart creation function (S1804 and S1805) and a write function (S1806).

More specifically, as shown in FIG. 18, when the flowchart creation means 25 is activated, for example, similar to the conversion means 21, the flowchart creation means 25 gets a secondary module name which identifies a target secondary module 32 (S1800). The flowchart creation means 25 reads the target secondary module 32 that is identified by the obtained secondary module name from the storage device 30' (S1802). If the target secondary module 32 is not stored in the storage device 30', the flowchart creation means 25 ends its process (not shown).

Then, the flowchart creation means 25 creates the table-form flowchart 33 where the secondary sentences 327 which correspond to the true case and the false case of the secondary conditional expression, respectively, are arranged at left and right sides of a table (S1804). More specifically, the flowchart 33 is created from the secondary sentences 327 of the secondary module 32, wherein the secondary sentences 327 that has hierarchies same as one another are arranged in the flowchart 33 in such a manner that the secondary sentence 327 to be executed when the secondary conditional expression is satisfied and the secondary sentence 327 to be executed when the secondary conditional expression is not satisfied are arranged at the left and right sides of the table, respectively, and each of the hierarchies of the secondary sentences 327 is specified by the hierarchy ID 323. Meanwhile, the line numbers 322 are output to the flowchart 33 so as to correspond to the secondary sentences 327. The flowchart creation means 25 according to the present embodiment determines that the hierarchies specified by the respective hierarchy IDs 323 are same as one another when the hierarchy depths of the hierarchy IDs 323 are same as one another and the branch hierarchies of the hierarchy IDs 323 are same as one another except the end digits ("1" or "2") of the respective branch hierarchies.

Then, the flowchart creation means 25 marks the parts (target ranges) similar to each other in the flowchart (S1805). More specifically, as shown in an example in FIG. 19, among the lines 320 of the secondary module 32, the part (target range) where the similarity existence 329$f$ is set to "similar one exists" is framed and has a display such as "PATTERN nn" (nn is, for example, a serial number). For example, the serial number (nn) can be sequentially incremented from the top of the flowchart.

Then, the flowchart creation means 25 writes the flowchart 33 into the storage device 30' (S1806) and ends its process.

Figure 19:
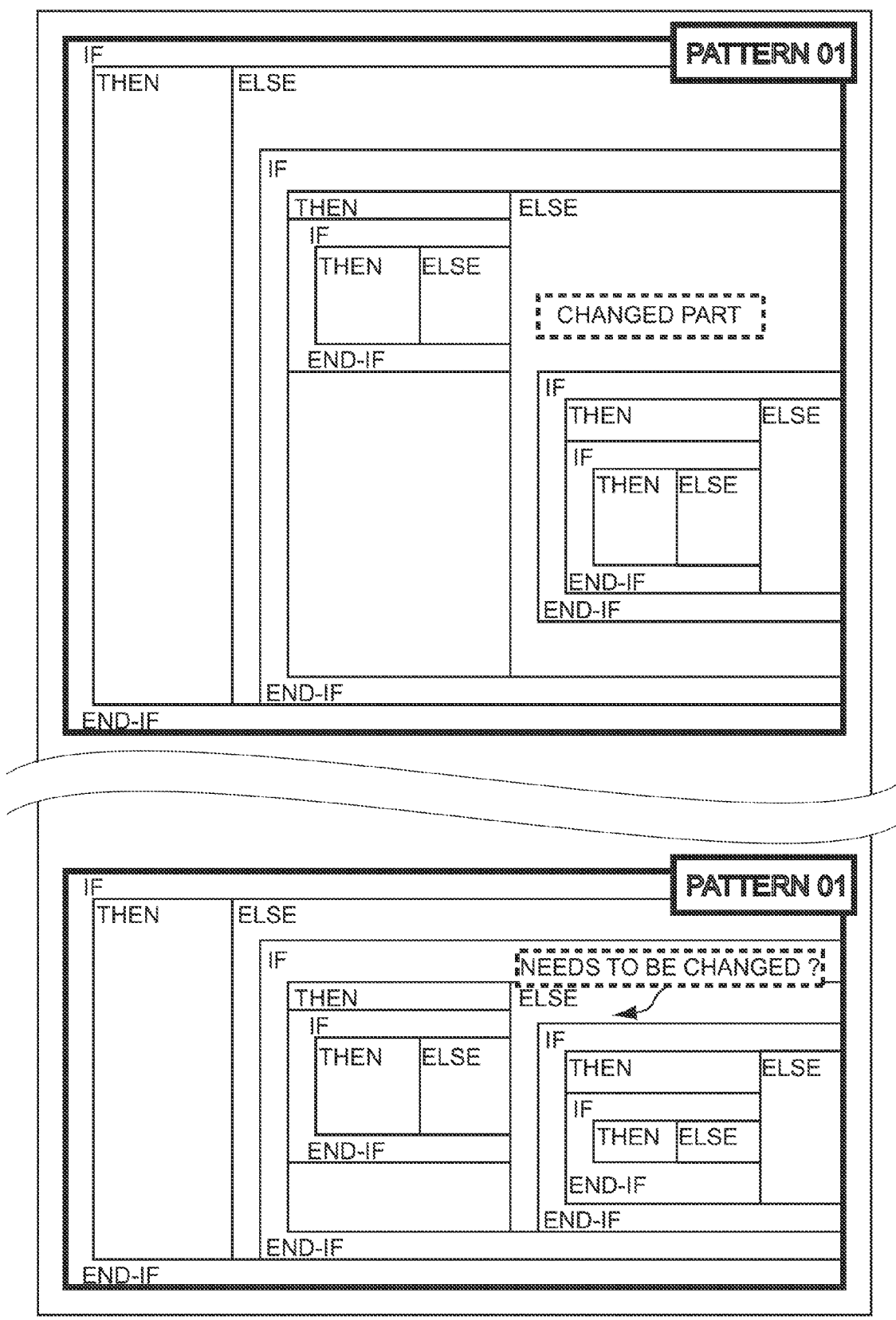
FIG. 19 is diagram partially showing a flowchart created from the secondary module of FIG. 17.

As can be seen from FIG. 19, by indicating the parts (target ranges) similar to each other clearly and visually, for example, miss in maintenance can be found out. For example, in a case where one of the target ranges similar to each other is changed while a remaining one is not changed, necessity of changing the remaining one can be recognized.

The flowchart creation means 25 may have the analyzing function, the write function and the output function of the analyzing means 27'. In other words, the flowchart creation means 25 may be the analyzing means 27'.

Third Embodiment

Figure 20:
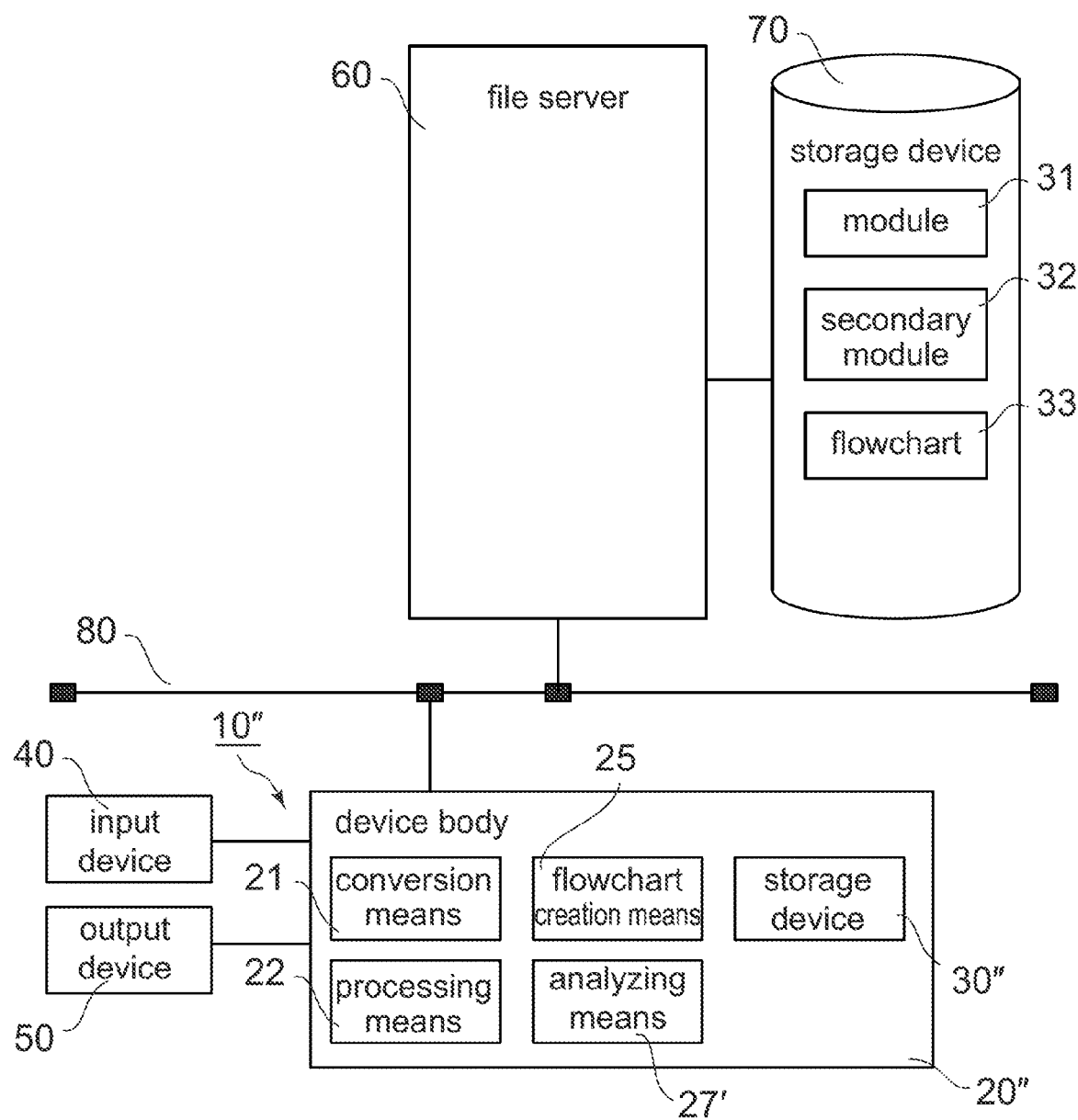
FIG. 20 is a system diagram showing a structure analysis device according to a third embodiment of the present invention.

As shown in FIG. 20, a structure analysis device 10" according to the third embodiment of the present invention comprises a device body 20", a storage device (storage means) 30", the input device 40 and the output device 50. The storage device 30" according to the present embodiment is a primary storage device of the device body 20". Similar to the device body 20' according to the second embodiment, the device body 20" comprises the conversion means 21, the processing means 22, the analyzing means 27' and the flowchart creation means 25.

The structure analysis device 10" is communicatable connected to a file server 60 via a communication line 80. For example, the communication line 80 may be a local area network (LAN) or may be the Internet. The file server 60 comprises a storage device (storage means) 70. The storage device 70 can store the modules 31, the secondary modules 32 and the flowcharts 33. Accordingly, the structure analysis device 10" can read the module 31 and so on from the storage device 70 and write the module 31 and so on into the storage device 70.

As can be seen easily, according to the present embodiment, similar to the first and the second embodiments, parts similar to each other in the module 31 can be found out. Moreover, the found similar parts can be shared among a plurality of the structure analysis devices 10".

The present application is based on a Japanese patent application of JP2012-088098 filed before the Japan Patent Office on Apr. 9, 2012, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10, 10', 10" structure analysis device
20, 20', 20" device body
21 conversion means
22 processing means
25 flowchart creation means
27, 27' analyzing means
30, 30', 30" storage device (storage means)
31 module (source program)
310 line
311 sequence number (line ID)
312 sentence
32 secondary module (module)
320 secondary line (line)
321 module ID
322 line number
323 hierarchy ID
324 operation ID
326 sequence number (line ID)
327 secondary sentence
329 hierarchical structure
329$p$ hierarchy pattern
329$r$ similarity notifier
329$f$ similarity existence
33 flowchart
36 hierarchical structure data
360 line
361 sequence number (line ID)
362 hierarchy pattern
363 end line (sequence number)
364 similarity notifier
364$n$ similar line (sequence number)
40 input device
50 output device
60 file server
70 storage device (storage means)
80 communication line

The invention claimed is:

1. A structure analysis device for performing structure analysis of a module including a plurality of sentences written in a programming language, wherein the plurality of sentences of the module include a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therewithin as said at least one of the executable-on-satisfaction statement and the executable-on-failure statement so that the plurality of conditional statements form a hierarchization of the plurality of sentences, and wherein the hierarchization forms a specifiable hierarchical structure for each of a plurality of target ranges, each of which includes a series of sentences from among the plurality of sentences in the module; the structure analysis device comprising:
a storage device; and
a CPU which is configured to operate as an analyzing device;
wherein the storage device stores the module; and
wherein the analyzing device performs the structure analysis of the module stored in the storage device by obtaining the module from the storage device, and when the hierarchical structure of a first one of the plurality of target ranges is the same as the hierarchical structure of a second one of the plurality of target ranges, creating a similarity notifier in association with at least one of the first target range and the second target range, wherein the first target range and the second target range are different from each other from among the plurality of target ranges in the obtained module, and wherein the similarity notifier notifies existence of target ranges similar to each other in the obtained module, and
wherein the hierarchical structure of each target range is identifiable by using a hierarchy pattern that is a combination of hierarchy levels involved in the target range, wherein each hierarchy level indicates a hierarchy depth with respect to a sentence at a top of the target range.

2. The structure analysis device as recited in claim 1, wherein each target range includes at least one of the plurality of conditional statements, and wherein each target range corresponds to a range from a start to an end of a corresponding conditional statement included in the target range.

3. The structure analysis device as recited in claim 1, wherein the analyzing device determines that the hierarchical structure of the first target range and the hierarchical structure of the second target range are the same as each other when the hierarchy pattern of the first target range and the hierarchy pattern of the second target range are the same as each other.

4. The structure analysis device as recited in claim 1, wherein the analyzing device uses as the first target range, in a descending order of a number of hierarchy levels that are combined into the hierarchy pattern, each of the plurality of target ranges.

5. The structure analysis device as recited in claim 4, wherein the analyzing device does not use as the first target range, a target range that satisfies a predetermined condition.

6. The structure analysis device as recited in claim 5, wherein the predetermined condition is a condition depending on the number of the hierarchy levels combined into the hierarchy pattern of the target range.

7. The structure analysis device as recited in claim 1, wherein the module is a combination of a plurality of modules.

8. The structure analysis device as recited in claim 1, wherein the analyzing device stores the module and the similarity notifier into the storage device in association with each other.

9. The structure analysis device as recited in claim 1, further comprising an output device; and
wherein the analyzing device outputs the module and the similarity notifier to the output device while associating them with each other.

10. A structure analysis device for performing structure analysis of a module including a plurality of sentences written in a programming language, wherein the plurality of sentences of the module include a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therewithin as said at least one of the executable-on-satisfaction statement and the executable-on-failure statement so that the plurality of conditional statements form a hierarchization of the plurality of sentences, and wherein the hierarchization forms a specifiable hierarchical structure for each of a plurality of target ranges, each of which includes a series of sentences from among the plurality of sentences in the module; the structure analysis device comprising:
a storage device, and
a device body coupled to the storage device;
wherein the storage device stores the module; and
wherein the device body obtains the module from the storage device and creates, when the hierarchical structure of a first one of the plurality of target ranges is the same as the hierarchical structure of a second one of the plurality of target ranges, a similarity notifier in association with at least one of the first target range and the second target range, wherein the first target range and the second target range are different from each other from among the plurality of target ranges in the obtained module, and wherein the similarity notifier notifies existence of target ranges similar to each other in the obtained module, and
wherein the hierarchical structure of each target range is identifiable by using a hierarchy pattern that is a combination of hierarchy levels involved in the target range, wherein each hierarchy level indicates a hierarchy depth with respect to a sentence at a top of the target range.

11. A method for performing structure analysis of a module, the method being performed by a computer system which includes a storage device that stores the module, wherein the module includes a plurality of sentences written in a programming language, wherein the plurality of sentences of the module include a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therewithin as said at least one of the executable-on-satisfaction statement and the executable-on-failure statement so that the plurality of conditional statements form a hierarchization of the plurality of sentences, and wherein the hierarchization forms a specifiable hierarchical structure for each of a plurality of target ranges, each of which includes a series of sentences from among the plurality of sentences in the module, the method comprising:

obtaining the module from the storage device; and creating, when the hierarchical structure of a first one of the plurality of target ranges is the same as the hierarchical structure of a second one of the plurality of target ranges, a similarity notifier in association with at least one of the first target range and the second target range, wherein the first target range and the second target range are different from each other from among the plurality of target ranges in the obtained module, and wherein the similarity notifier notifies existence of target ranges similar to each other in the obtained module, and wherein the hierarchical structure of each target range is identifiable by using a hierarchy pattern that is a combination of hierarchy levels involved in the target range, wherein each hierarchy level indicates a hierarchy depth with respect to a sentence at a top of the target range.

12. A non-transitory computer-readable storage medium having stored thereon a program for performing structure analysis of a module on a computer system including a storage device that stores the module, wherein the module includes a plurality of sentences written in a programming language, wherein the plurality of sentences of the module include a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therewithin as said at least one of the executable-on-satisfaction statement and the executable-on-failure statement so that the plurality of conditional statements form a hierarchization of the plurality of sentences, and wherein the hierarchization forms a specifiable hierarchical structure for each of a plurality of target ranges, each of which includes a series of sentences from among the plurality of sentences in the module, the program being executable by a processor of the computer system to perform functions comprising:

obtaining the module from the storage device; and creating, when the hierarchical structure of a first one of the plurality of target ranges is the same as the hierarchical structure of a second one of the plurality of target ranges, a similarity notifier in association with at least one of the first target range and the second target range, wherein the first target range and the second target range are different from each other from among the plurality of target ranges in the obtained module, and wherein the similarity notifier notifies existence of target ranges similar to each other in the obtained module, and wherein the hierarchical structure of each target range is identifiable by using a hierarchy pattern that is a combination of hierarchy levels involved in the target range, wherein each hierarchy level indicates a hierarchy depth with respect to a sentence at a top of the target range.

* * * * *